US006452358B1

(12) United States Patent
Iijima et al.

(10) Patent No.: US 6,452,358 B1
(45) Date of Patent: Sep. 17, 2002

(54) ELECTRONIC APPARATUS AND CONTROL METHOD FOR ELECTRONIC APPARATUS

(75) Inventors: Yoshitaka Iijima; Kenji Iida, both of Shiojiri; Shinji Nakamiya, Matsumoto, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/744,421

(22) PCT Filed: May 18, 2000

(86) PCT No.: PCT/JP00/03183

§ 371 (c)(1), (2), (4) Date: Jan. 23, 2001

(87) PCT Pub. No.: WO00/73857

PCT Pub. Date: Dec. 7, 2000

(30) Foreign Application Priority Data

Jun. 1, 1999 (JP) .......................................... 11-154287

(51) Int. Cl.[7] ................................................ H02P 1/42

(52) U.S. Cl. ....................... 318/727; 318/812; 318/822; 318/479; 318/140; 322/28

(58) Field of Search ................................ 318/727, 812, 318/822, 479, 140; 322/28

(56) References Cited

U.S. PATENT DOCUMENTS 6,121,757 A * 9/2000 Takahashi et al. ............ 322/28
6,204,636 B1 * 3/2001 Kinoshita et al. ........... 320/134
6,219,499 B1 * 4/2001 Hayashi ...................... 320/134

FOREIGN PATENT DOCUMENTS

| | | |
|---|---|---|
| JP | 3-58073 | 9/1991 |
| JP | 3-229193 | 10/1991 |
| JP | 11-6881 | 1/1999 |

* cited by examiner

*Primary Examiner*—Karen Masih
(74) *Attorney, Agent, or Firm*—Michael T. Gabrik

(57) ABSTRACT

In an electronic apparatus which includes a power generator and a storage device for storing electric energy obtained thereby, it is detected whether a motor driven by the stored electric energy is rotating by comparing the rotation detecting voltage, which is proportional to the induction voltage generated in the motor caused by the rotation of the motor, with a rotation reference voltage. The generation state of the power generator or the charging state of the storage device is detected. The level of the rotation detecting voltage or the level of the rotation reference voltage is shifted by a predetermined amount based on the detected generation state of the power generator or the detected charging state of the storage device so that the voltage difference between the rotation detecting voltage and the rotation reference voltage is increased during the no-rotation period.

29 Claims, 18 Drawing Sheets

ELECTRONIC APPARATUS AND CONTROL METHOD FOR ELECTRONIC APPARATUS

TECHNICAL FIELD

The present invention relates to an electronic apparatus and a control method therefor, and more preferably, to an electronic apparatus, such as a portable electronic timepiece apparatus, having a built-in storage device and a drive motor, and to a control method for such an electronic apparatus.

BACKGROUND ART

Recently, small electronic timepieces, such as wristwatches, which have a built-in generator device, such as a solar cell, and which can be operated without the need for replacing batteries have been realized.

These electronic timepieces are provided with a function of temporarily charging power generated in the generator device into, for example, a large-capacitance capacitor, and when power is not being generated, time is indicated by the power discharged from the capacitor.

Accordingly, such electronic timepieces can be stably operated for a long time without batteries, and by considering the effort required to replace batteries and the problem of disposing of them, it can be expected that many electronic timepieces will have a built-in generator device.

As such an electronic timepiece having a built-in generator device, there is an analog electronic timepiece disclosed in Japanese Examined Patent Publication No. 3-58073.

In this analog electronic timepiece, a rotation detecting circuit for detecting the rotation of a motor used for driving hands is constructed in such a manner that a detection resistor device is selected from a plurality of detection resistor devices in accordance with the performance of the motor.

In the above-described related art, in selecting the detection resistor device in accordance with the performance of the motor, the following problem may occur. If a detection resistor device which increases the detection sensitivity is selected, AC magnetic noise which is caused by the operation of a generator device which would not normally be detected in detecting AC magnetic fields is disadvantageously detected. As a result, it may be erroneously detected that the motor is rotated, though it is not actually rotated.

Because of such erroneous detection, the driving of the motor cannot be reliably controlled.

Accordingly, it is an object of the present invention to provide an electronic apparatus and a control method therefor in which the driving of a motor can be reliably controlled by reducing the influence of noise caused by, for example, a leakage flux of a generator device.

DISCLOSURE OF INVENTION

A first aspect of the present invention is characterized by including: a power generator portion for performing power generation; a storage portion for storing electric energy obtained by the power generation; a single or a plurality of motors driven by the electric energy stored in the storage portion; a pulse driving controller for controlling the driving of the motor by outputting a driving pulse signal; a rotation detecting portion for detecting whether the motor is rotating by comparing a rotation detecting voltage corresponding to an induction voltage generated in the motor caused by the rotation of the motor with a rotation reference voltage; a state detecting portion for detecting a generation state of the power generator portion or a charging state of the storage portion caused by the power generation; and a voltage setting portion for setting the rotation detecting voltage or the rotation reference voltage based on the generation state of the power generator portion or the charging state of the storage portion detected by the state detecting portion so that a difference between the rotation detecting voltage in a no-rotation period and the rotation reference voltage is increased.

A second aspect of the present invention is characterized in that, in the first aspect of the present invention, the voltage setting portion may include a voltage shifting portion for relatively shifting the voltage level of the rotation detecting voltage to a no-rotation side by a predetermined amount.

A third aspect of the present invention is characterized in that, in the first aspect of the present invention, the state detecting portion may include a charging detecting portion for detecting whether the charging is performed in the storage portion.

A fourth aspect of the present invention is characterized in that, in the first aspect of the present invention, the state detecting portion may include a power-generation magnetic-field detecting portion for detecting whether a magnetic field is generated by the power generation of the power generator portion.

A fifth aspect of the present invention is characterized in that, in the second aspect of the present invention, the rotation detecting portion may include a rotation-detecting impedance device, and the voltage shifting portion may include an impedance reducing portion for effectively reducing the impedance of the rotation-detecting impedance device.

A sixth aspect of the present invention is characterized in that, in the fifth aspect of the present invention, the rotation-detecting impedance device may include a plurality of auxiliary rotation-detecting impedance devices, and the impedance-reducing portion may effectively reduce the impedance of the rotation-detecting impedance device by short-circuiting at least one of the plurality of auxiliary rotation-detecting impedance devices.

A seventh aspect of the present invention is characterized in that, in the fifth aspect of the present invention, the rotation-detecting impedance device may include a plurality of auxiliary rotation-detecting impedance devices, and the impedance-reducing portion may effectively reduce the impedance of the rotation-detecting impedance device by switching the plurality of auxiliary rotation-detecting impedance devices.

An eighth aspect of the present invention is characterized in that, in the fifth aspect of the present invention, the rotation-detecting impedance device may include a resistor device.

A ninth aspect of the present invention is characterized in that, in the first aspect of the present invention, there may be provided a chopper amplifier portion for performing chopper amplification on the induction voltage and for outputting the amplified induction voltage as the rotation detecting voltage, and the voltage setting portion may include an amplification-factor reducing portion for reducing an amplification factor of the chopper amplifier portion based on the generation state of the power generator portion or the charging state of the storage portion detected by the state detecting portion.

A tenth aspect of the present invention is characterized in that, in the ninth aspect of the present invention, the amplification-factor reducing portion may include a voltage-drop-device inserting portion for inserting a voltage drop device in a path of a chopper current generated by the chopper amplification.

An eleventh aspect of the present invention is characterized in that, in the ninth aspect of the present invention, the chopper amplifier portion may perform the chopper amplification at a frequency corresponding to a chopper-amplification control signal, and the amplification-factor reducing portion may set the frequency of the chopper-amplification control signal in a detection period of a predetermined generation state or a predetermined charging state caused by the power generation to be higher by a predetermined amount than the chopper-amplification control signal in a no-detection period of the predetermined generation state or the predetermined charging state.

A twelfth aspect of the present invention is characterized in that, in the ninth aspect of the present invention, the chopper amplifier portion may set a chopper duty in a detection period of the charging to be greater or smaller than the chopper duty in a no-detection period of the charging, which is a reference chopper duty.

A thirteenth aspect of the present invention is characterized in that, in the first aspect of the present invention, the voltage setting portion may include a voltage shifting portion for shifting the voltage level of the rotation reference voltage to a rotation side by a predetermined amount relative to the rotation detecting voltage based on the generation state of the power generator portion or the charging state of the storage portion detected by the state detecting portion.

A fourteenth aspect of the present invention is characterized in that, in the thirteenth aspect of the present invention, the voltage shifting portion may include a reference-voltage selecting portion for selecting one of a plurality of basic rotation reference voltages as the rotation reference voltage based on the generation state of the power generator portion or the charging state of the storage portion detected by the state detecting portion.

A fifteenth aspect of the present invention is characterized in that, in the fourteenth aspect of the present invention, the state detecting portion may detect the charging state based on a charging current flowing in the storage portion.

A sixteenth aspect of the present invention is characterized in that, in the fourteenth aspect of the present invention, the state detecting portion may detect the charging state based on a charging voltage of the storage portion.

A seventeenth aspect of the present invention is characterized in that, in the second aspect or the thirteenth aspect of the present invention, the pulse driving controller may output a rotation-detecting pulse signal used for detecting the rotation by the rotation detecting portion after the lapse of a predetermined period from an output of the driving pulse signal, and the voltage shifting portion may set terminals of a coil forming the motor in a closed loop during the predetermined period based on the generation state of the power generator portion or the charging state of the storage portion detected by the state detecting portion.

An eighteenth aspect of the present invention is characterized in that, in the seventeenth aspect of the present invention, the voltage shifting portion may set a frequency of the driving pulse signal in a detection period of a predetermined generation state or a predetermined charging state to be lower than a frequency in a no-detection period of the predetermined generation state or the predetermined charging state based on the generation state of the power generator portion or the charging state of the storage portion detected by the state detecting portion.

A nineteenth aspect of the present invention is characterized in that, in the second aspect or the thirteenth aspect of the present invention, the driving pulse signal may include a plurality of auxiliary driving pulse signals, and the voltage shifting portion may set an effective power of the last auxiliary driving pulse signal in an output period of the driving pulse signal to be greater than an effective power of the other auxiliary driving pulse signal in the output period of the driving pulse signal.

A twentieth aspect of the present invention is characterized in that, in the first aspect of the present invention, the electronic apparatus may be portable.

A twenty-first aspect of the present invention is characterized in that, in the first aspect of the present invention, the electronic apparatus may include a timepiece portion for performing a timing operation.

According to a twenty-second aspect of the present invention, in a control method for an electronic apparatus which includes a power generator portion for performing power generation, a storage portion for storing electric energy obtained by the power generation, a single or a plurality of motors driven by the electric energy stored in the storage portion, and a pulse driving controller for controlling the driving of the motor by outputting a driving pulse signal, the control method is characterized by including: a rotation detecting step of detecting whether the motor is rotating by comparing a rotation detecting voltage corresponding to an induction voltage generated in the motor caused by the rotation of the motor with a rotation reference voltage; a state detecting step of detecting a generation state of the power generator portion or a charging state of the storage portion caused by the power generation; and a voltage shifting step of shifting the voltage level of the rotation detecting voltage to a no-rotation side by a predetermined amount relative to the rotation reference voltage based on the generation state of the power generator portion or the charging state of the storage portion detected in the state detecting step.

According to a twenty-third aspect of the present invention, in a control method for an electronic apparatus which includes a power generator portion for performing power generation, a storage portion for storing electric energy obtained by the power generation, a single or a plurality of motors driven by the electric energy stored in the storage portion, and a pulse driving controller for controlling the driving of the motor by outputting a driving pulse signal, the control method is characterized by including: a rotation detecting step of detecting whether the motor is rotating by comparing a rotation detecting voltage corresponding to an induction voltage generated in the motor caused by the rotation of the motor with a rotation reference voltage; a state detecting step of detecting a generation state of the power generator portion or a charging state of the storage portion caused by the power generation; and a voltage shifting step of shifting the voltage level of the rotation reference voltage to a rotation side by a predetermined amount relative to the rotation detecting voltage based on the generation state of the power generator portion or the charging state of the storage portion detected in the state detecting step.

BEST MODE FOR CARRYING OUT THE INVENTION

Preferred embodiments of the present invention are described below with reference to the drawings.

[1] First Embodiment

[1.1] Overall Configuration

Figure 1:
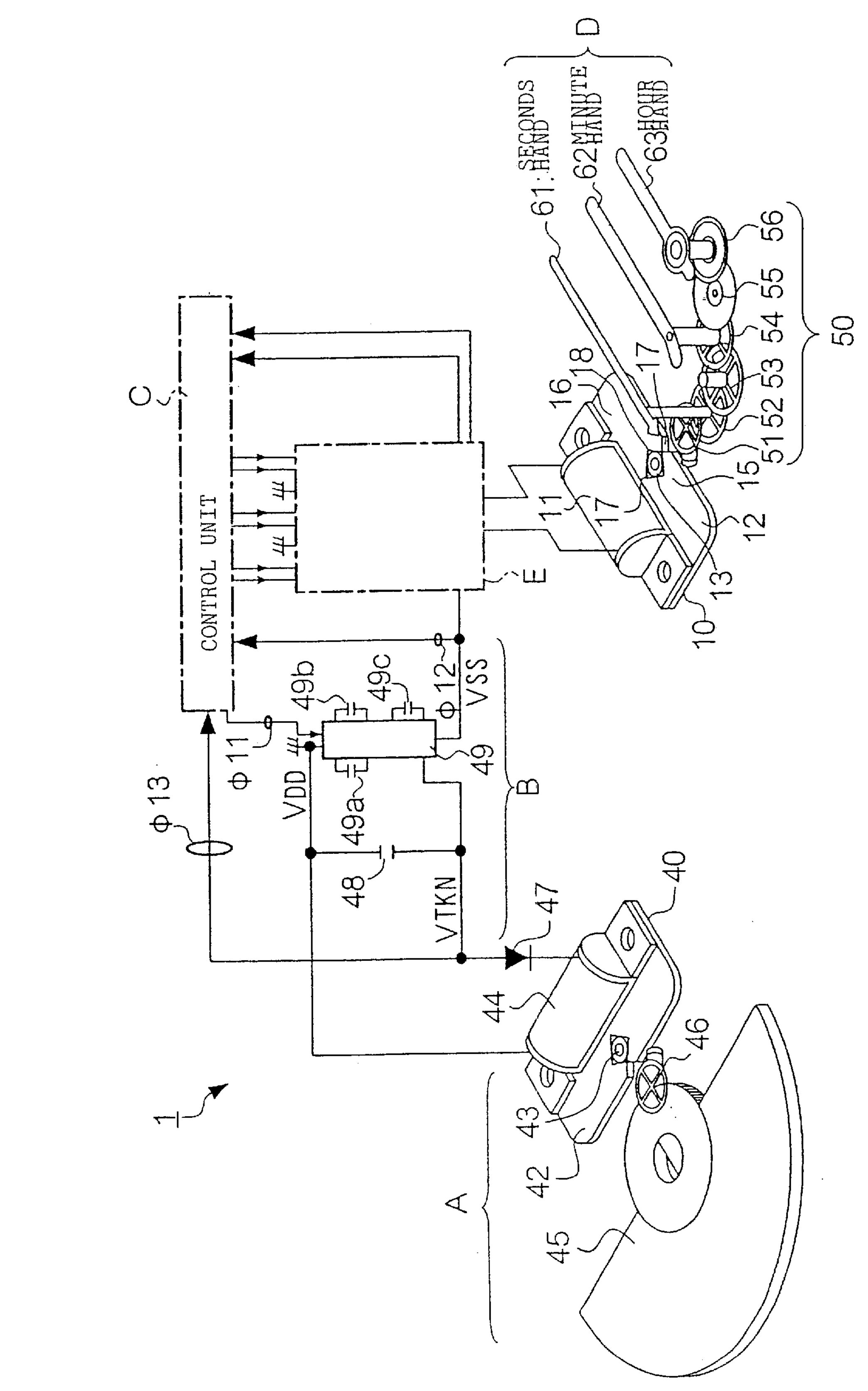
FIG. 1 is a schematic diagram illustrating the configuration of a timepiece apparatus.

FIG. 1 illustrates a schematic configuration of a timepiece apparatus 1, which is an electronic apparatus of a first embodiment.

The timepiece apparatus 1 is a wristwatch, which is used by a user wearing a strap connected to the main body of the apparatus around the wrist.

The timepiece apparatus 1 is largely formed of a generator unit A for generating AC power, a power supply unit B for rectifying the AC voltage from the generator unit A and storing the increased voltage and for supplying power to the elements of the apparatus, a control unit C for detecting the power-generation state of the generator unit A and for controlling the entire apparatus based on a detection result, a hand-moving mechanism D for driving hands, and a driving unit E for driving the hand-moving mechanism D based on a control signal from the control unit C.

In this case, according to the power-generation state of the generator unit A, the control unit C switches between a display mode in which time is indicated by driving the hand-moving mechanism D and a saving mode in which power is saved by interrupting the supply of power to the hand-moving mechanism D. The saving mode is forced to switch to the display mode by the user shaking the timepiece apparatus 1 by hand. The individual elements are discussed below. The control unit C will be described later by using functional blocks.

The generator unit A largely includes a generator device 40, an oscillating weight 45 which oscillates within the device in response to the movement of a user's arm so as to convert dynamic energy to rotational energy, and an accelerating gear 46 for converting (accelerating) the oscillation of the oscillating weight to a required number of oscillations so as to transfer it to the generator device 40.

The oscillations of the oscillating weight 45 are conveyed to a generator rotor via the accelerating gear 46 so as to rotate the generator rotor 43 within a generator stator 42. Accordingly, the generator device 40 serves as an electromagnetic-induction-type AC generator device for outputting power induced in a generator coil 44 connected to the generator stator 42 to the outside.

Thus, the generator unit A generates power by utilizing energy related to the user's daily life so as to drive the timepiece apparatus 1 by using the power.

The power supply unit B is formed of a diode 47, which serves as a rectifier circuit, a large-capacitance capacitor 48, and a step-up/down circuit 49.

The step-up/down circuit 49 increases or decreases the voltage in multiple stages by using a plurality of capacitors 49*a*, 49*b*, and 49*c* so as to adjust the voltage to be supplied to the driving unit E by a control signal $\phi$11 from the control unit C.

An output voltage of the step-up/down circuit 49 is supplied to the control unit C with a monitor signal $\phi$12, thereby enabling the control unit C to monitor the output voltage and to determine from a small increase or decrease of the output voltage whether the generator unit A is generating power. The power supply unit B sets VDD (high potential) as a reference potential (GND) and generates VTKN (low potential) as a power supply voltage.

According to the above description, it is detected whether power is generated by monitoring the output voltage of the step-up/down circuit 49 by using the monitor signal $\phi$12. However, in a circuit configuration without a step-up/down circuit, it may be detected whether power is generated by directly monitoring the low-potential power supply voltage VTKN.

The hand-moving mechanism D is as follows. A stepping motor 10 used in the hand-moving mechanism D, which is also referred to as a pulse motor, a stepper motor, a step motor, or a digital motor, is a motor which is often used as an actuator of a digital control unit and is driven by a pulse signal. These days, many smaller and lighter stepping motors are being used as actuators for use in portable-type small electronic apparatuses or information apparatuses. Typical examples of such electronic apparatuses are timepiece devices, such as electronic timepieces, time switches, and chronographs.

The stepping motor 10 of this example includes a driving coil 11 for generating a magnetic force by a driving pulse supplied from the driving unit E, a stator 12 excited by this driving coil 11, and a rotor 13 rotated by a magnetic field which is excited within the stator 12. The stepping motor 10 is a PM type (permanent magnet rotation type) in which the rotor 13 is formed of a disc-type bipolar permanent magnet. The stator 12 is provided with a magnetically saturated portion 17 so that different magnetic poles are generated in the corresponding phases (poles) 15 and 16 around the rotor 13 by the magnetic force generated by the driving coil 11. Moreover, in order to define the rotating direction of the rotor 13, an inner notch 18 is provided at a suitable position in the inner circumference of the stator 12, whereby a cogging torque is generated to stop the rotor 13 at a suitable position.

The rotation of the rotor 13 of the stepping motor 10 is conveyed to the individual hands by a wheel train 50, which is formed of a fifth wheel and pinion 51, a fourth wheel and pinion 52, a third wheel and pinion 53, a second wheel and pinion 54, a minute wheel 55, and an hour wheel 56, meshed with the rotor 13 via the pinions. A seconds hand 61 is connected to the shaft of the fourth wheel and pinion 52, a minute hand 62 is connected to the shaft of the second wheel and pinion 54, and an hour hand 63 is connected to the shaft of the hour wheel 56. Time is indicated by these hands, operating in association with the rotation of the rotor 13. A transfer system (not shown) for displaying the day, month, and year may be connected to the wheel train 50.

Then, the driving unit E supplies various driving pulses to the stepping motor 10 under the control of the control unit C. More specifically, by applying control pulses having different polarities and pulse widths at different times from the control unit C, driving pulses having different polarities, or detection pulses for exciting an induction voltage for detecting the rotation and the magnetic field of the rotor 13, are supplied to the driving coil 11.

[1.2] Functional Configuration of Control System

The functional configuration of the control system according to the first embodiment is now described with reference to FIG. 2.

Figure 2:
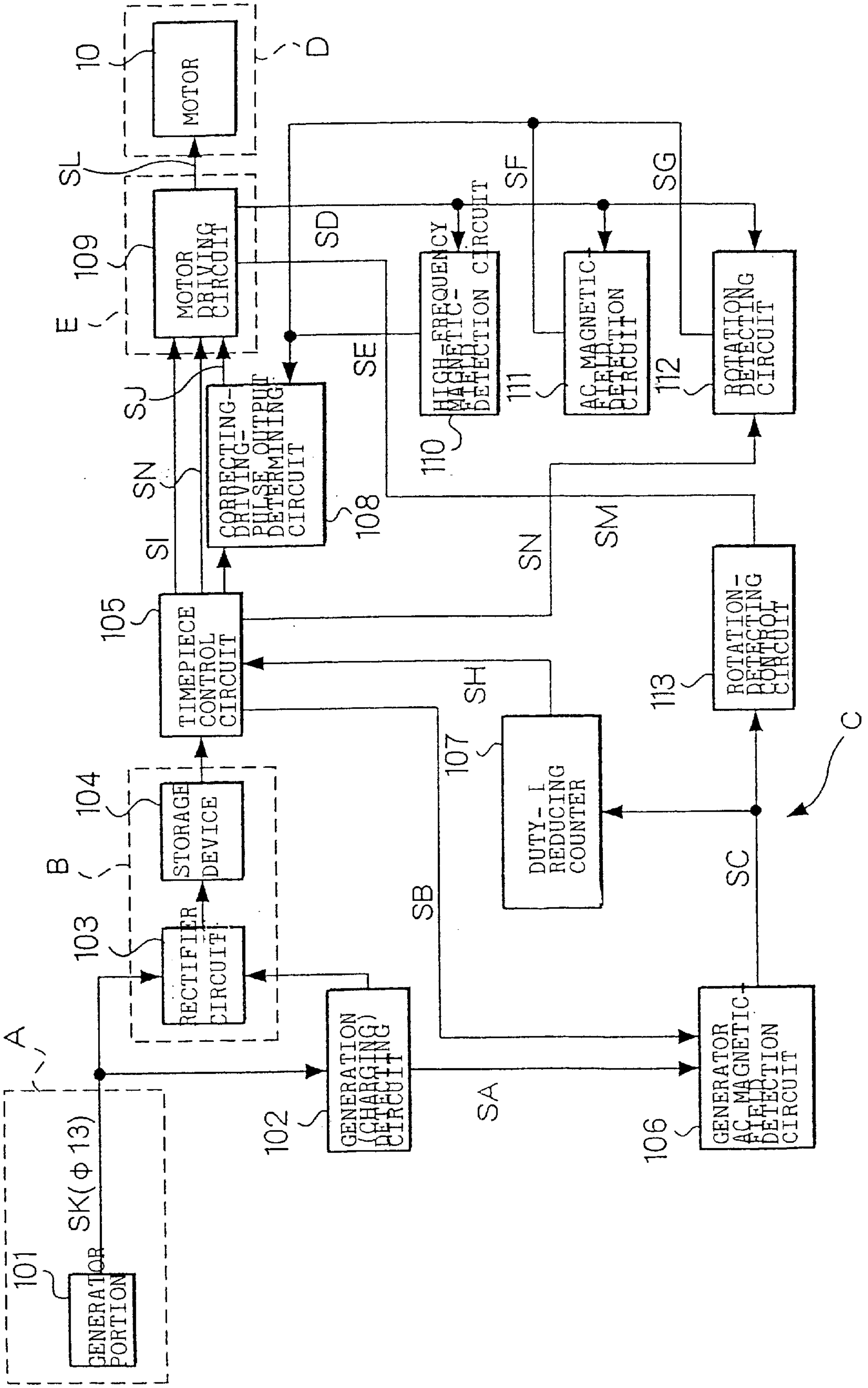
FIG. 2 is a block diagram illustrating the functional configuration of a timepiece apparatus of a first embodiment.

In FIG. 2, symbols A through E correspond to the generator unit A, the power supply unit B, the control unit C, the hand-moving mechanism D, and the driving unit E, respectively, shown in FIG. 1.

The timepiece apparatus 1 includes: a generator portion 101 for generating AC power; a charging detection circuit 102 for detecting charging based on a generated voltage SK of the generator portion 101 and for outputting a charging-detection result signal SA; a rectifier circuit 103 for rectifying an alternating current output from the generator portion 101 and for converting it to a direct current; a storage device 104 for storing the direct current from the rectifier circuit 103; and a timepiece control circuit 105, which is operated by the electric energy stored in the storage device 104, for outputting a normal motor-driving pulse signal SI for performing timepiece control and also for outputting a generator AC magnetic-field detection timing signal SB for designating the detection timing of the generator AC magnetic field.

The timepiece apparatus 1 also includes: a generator AC magnetic-field detection circuit 106 for detecting the generator AC magnetic field based on the charging-detection result signal SA and the generator AC magnetic-field detection timing signal SB and for outputting a generator AC magnetic-field detection result signal SC; a duty-reducing counter 107 for outputting a normal-motor-driving-pulse duty-reducing signal SH for performing the duty-reducing control of the normal motor-driving pulses based on the generator AC magnetic-field detection result signal SC; and a correcting-driving-pulse output circuit 108 for determining whether a correcting driving pulse signal SJ is to be output, based on the generator AC magnetic-field detection result signal SC and for outputting the correcting driving pulse signal SJ if necessary.

The timepiece apparatus 1 further includes: a motor driving circuit 109 for outputting a motor driving pulse signal SL for driving the pulse motor 10, based on the normal motor-driving pulse signal SI or the correcting driving pulse signal SJ; a high-frequency magnetic-field detection circuit 110 for detecting a high-frequency magnetic field based on an induction voltage signal SD output from the motor driving circuit 109 and for outputting a high-frequency magnetic-field detection result signal SE; an AC magnetic-field detection circuit 111 for detecting an AC magnetic field based on the induction voltage signal SD output from the motor driving circuit 109 and for outputting an AC magnetic-field detection result signal SF; a rotation detecting circuit 112 for detecting whether the motor 10 is rotating based on the induction voltage signal SD output from the motor driving circuit 109 and for outputting a rotation-detecting result signal SG; and a rotation-detecting control circuit 113 for outputting a rotation-detecting control signal SM based on the generator AC magnetic-field detection result signal SC output from the generator AC magnetic-field detection circuit 106.

In this case, a high-frequency magnetic field is spiky electromagnetic noise, such as electromagnetic noise generated in turning on/off the switches of household electrical appliances or a difference of temperature controllers of electric blankets, and is irregularly generated.

An AC magnetic field is a magnetic field at 50 [Hz] or 60 [Hz] generated from electrical appliances operated by commercial power, or is a magnetic field at a few hundred Hz to a few kHz generated by the rotation of a motor, such as a shaver.

Figure 3:
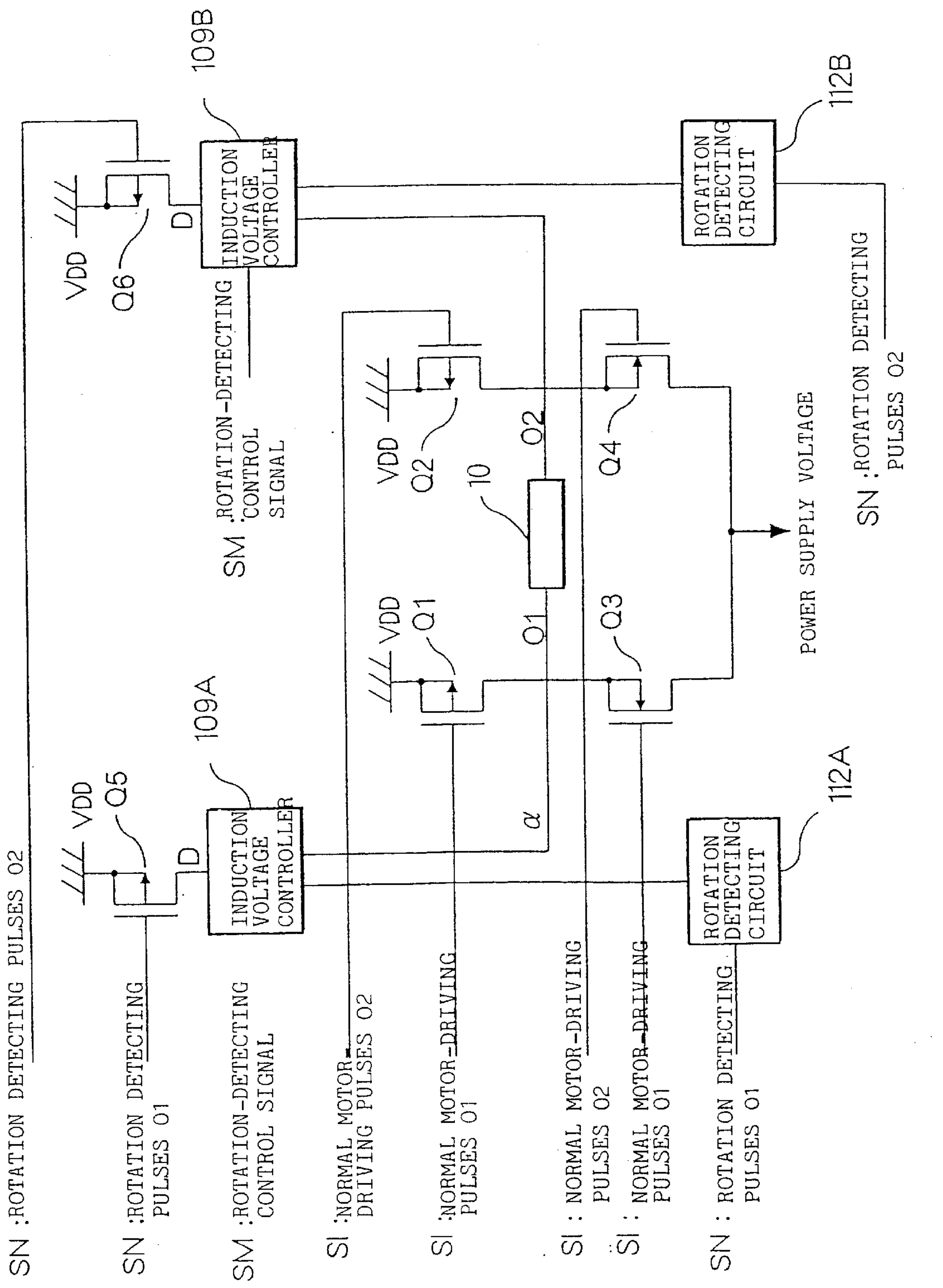
FIG. 3 is a diagram illustrating the portion close to a motor driving circuit and a rotation detecting circuit.

[1.3] Configuration of a Circuit Disposed Around Motor Driving Circuit and Rotation Detecting Circuit FIG. 3 illustrates an example of a circuit disposed around the motor driving circuit and the rotation detecting circuit.

The motor driving circuit 109 is formed of a P-channel first transistor Q1 which is controlled to be on or off based on the normal motor-driving pulse signal SI, a P-channel second transistor Q2 which is controlled to be on or off based on the normal motor-driving pulse signal SI, an N-channel third transistor Q3 which is controlled to be on or off based on the normal motor-driving pulse signal SI, and an N-channel fourth transistor Q4 which is controlled to be on or off based on the normal motor-driving pulse signal SI.

In this case, the first transistor Q1 and the fourth transistor Q4 are simultaneously turned on or turned off based on the normal motor-driving pulse signal SI.

The second transistor Q2 and the third transistor Q3 are simultaneously turned on or turned off in a manner opposite to the first transistor Q1 and the fourth transistor Q4 based on the normal motor-driving pulse signal SI.

The motor driving circuit 109 is also formed of induction voltage controllers 109A and 109B for controlling the voltage level of the induction voltage generated in the motor 10 based on a rotation-detecting pulse signal SN, a P-channel transistor Q5 for connecting the high-potential power VDD to the induction voltage controller 109A based on the rotation-detecting pulse signal SN, and a P-channel transistor Q6 for connecting the high-potential power VDD to the induction voltage controller 109B based on the rotation-detecting pulse signal SN.

Further, the rotation detecting circuit 112 is formed of a rotation detecting circuit portion 112A for detecting the rotation when the motor coil (not shown) of the pulse motor 10 is rotated in a first direction, and a rotation detecting circuit portion 112B for detecting the rotation when the motor coil (not shown) of the pulse motor 10 is rotated in a second direction, which is opposite to the first direction.

Figure 4:
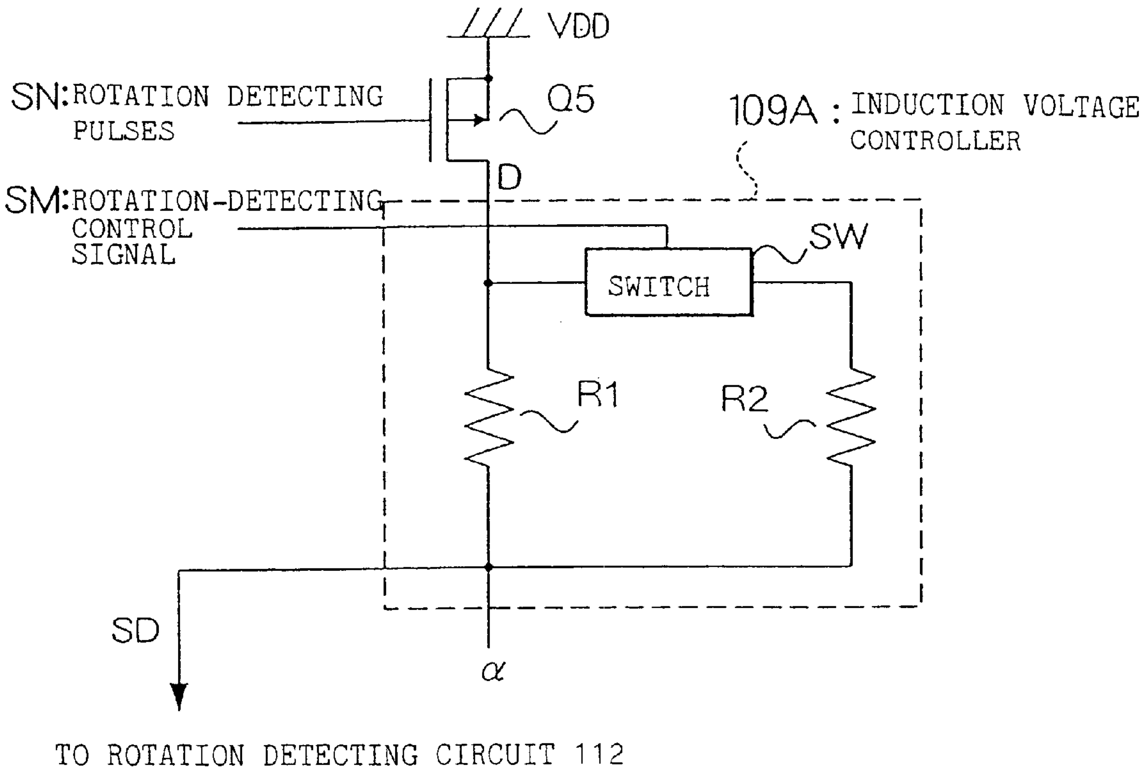
FIG. 4 is a schematic diagram illustrating an induction voltage controller.

The induction voltage controller 109A and the induction voltage controller 109B are described below with reference to FIG. 4. Since the configurations of the induction voltage controller 109A and the induction voltage controller 109B are identical, only the induction voltage controller 109A is shown in FIG. 4.

The induction voltage controller 109A is formed of a switch SW which is connected at one end to the drain D of the transistor Q5 and which is closed (turned on) during the input period (input timing) of the rotation-detecting pulse signal SN based on the rotation detecting control signal SM, a first resistor RI (rotation-detecting impedance device) which is connected at one end to the drain D of the transistor Q5 and at the other end to one input terminal of the motor 10, and a second resistor R2 (rotation-detecting impedance device) which is connected at one end to the other end of the switch SW and at the other end to a node between the first resistor RI and the input terminal of the motor 10.

[1.4] Operation of Timepiece Apparatus

Figure 5:
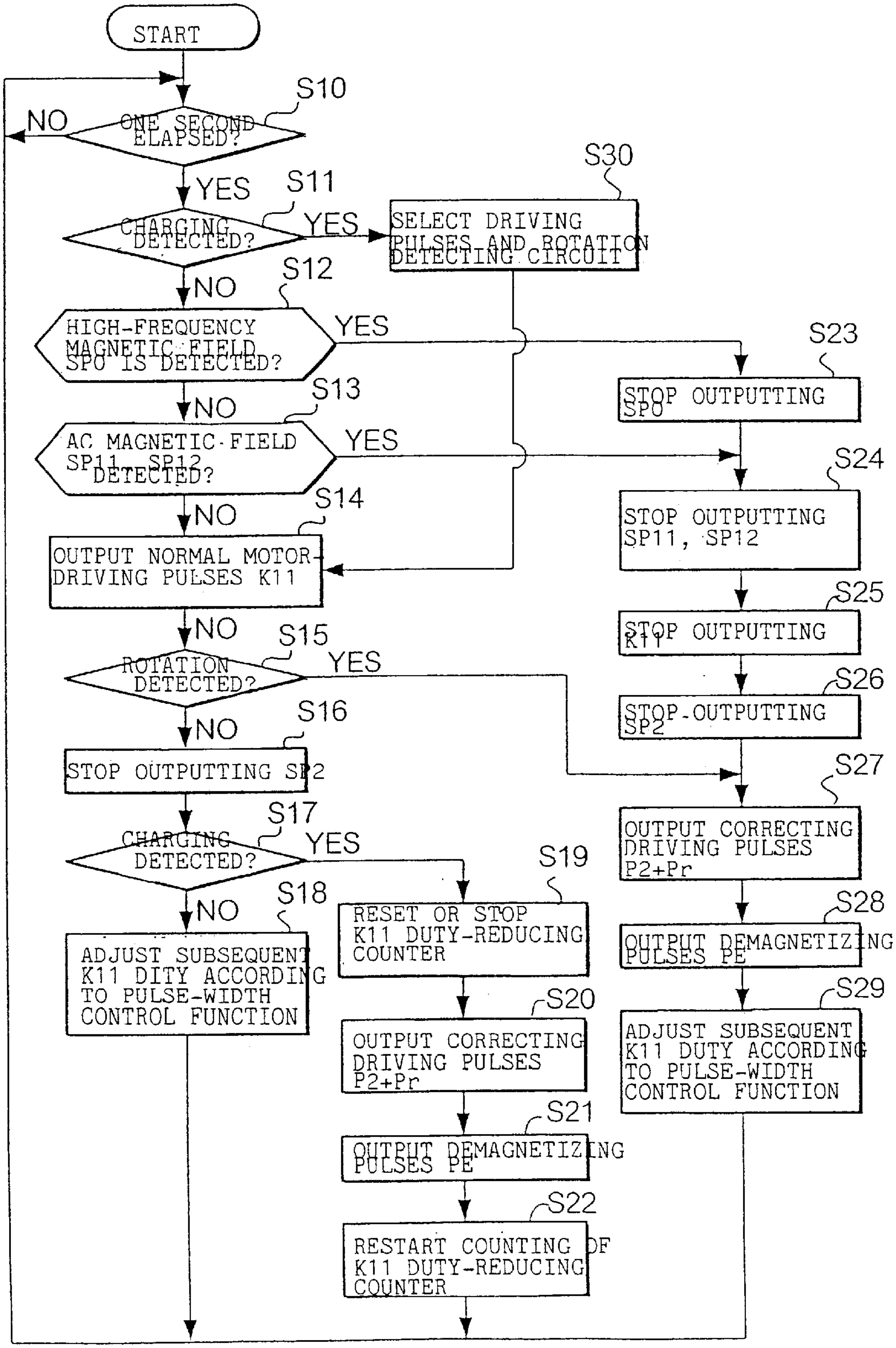
FIG. 5 is a flow chart of the process of an embodiment.

A description is given below of the operation of the timepiece apparatus 1 with reference to the flow chart of FIG. 5.

It is first determined whether one second has elapsed after the timepiece apparatus 1 was reset or the previous driving pulse was output (step S10).

If it is determined in step S10 that one second has not elapsed, it is not the time to output a driving pulse, and thus, the timepiece apparatus 1 enters a waiting state.

If it is determined in step S10 that one second has elapsed, it is determined by the charging detection circuit 102 whether charging caused by the power generation of the generator portion 101 has been detected (step S11).

If it is determined in step S11 that charging has been detected (step S11; Yes), the detection of the rotation is controlled in such a manner that the impedance of the induction voltage controller 109A and the induction voltage controller 109B becomes low (step S30), and the process proceeds to step S14. More specifically, the switch SW is turned on by the rotation detecting control signal SM so as to connect the first resistor R1 and the second resistor R2 in parallel with each other, so that the impedance (resistance value) of the combined resistance of the first resistor R1 and the second resistor R2 is controlled to be lower than the impedance (resistance value) of the first resistor R1. The process then proceeds to step S14.

If it is found in step S11 that charging has not been detected (step S11; No), it is determined whether a high-frequency magnetic field is detected while a high-frequency magnetic-field detection pulse signal SP0 is being output (step S12)

[1.4.1] Processing to Be Performed when a High-frequency Magnetic Field is Detected While the High-frequency Magnetic-field Detection Pulse Signal SP0 is Being Output If it is determined in step S12 that a high-frequency magnetic field is detected while the high-frequency magnetic-field detection pulse signal SP0 is being output (step S12; Yes), the output of the high-frequency magnetic-field detection pulses SP0 is discontinued (step S23).

Subsequently, the outputs of AC magnetic-field detection pulses SP11 and AC magnetic-field detection pulses SP12 are discontinued (step S24), the output of normal driving-motor pulses K11 is discontinued (step S25), and the output of rotation detecting pulses SP2 is discontinued (step S26).

Then, correcting driving pulses P2+Pr are output (step S27). In this case, in actuality, the correcting driving pulses P2 drive the pulse motor 10, and the correcting driving pulses Pr are used for speedily shifting the pulse motor to a steady state by inhibiting vibrations after the rotor is rotated after driving the pulse motor.

Then, in order to cancel a residual magnetic flux accompanied by an application of the correcting driving pulses P2+Pr, demagnetizing pulses PE of the opposite polarity to the correcting driving pulses P2+Pr are output (step S28).

Subsequently, in performing pulse-width control, the duty ratio of the normal driving pulses K11 is set so that power consumption can be minimized and the correcting driving pulses P2+Pr are not output (step S29).

The process then returns to step S10, and processing similar to the above-described processing is repeated.

[1.4.2] Processing to Be Performed when a High-frequency Magnetic Field is not Detected, and an AC Magnetic Field is Detected While the AC Magnetic-field Detection Pulses SP11 or the AC Magnetic-field Detection Pulses SP12 are Being Output If it is determined in step S12 that a high-frequency magnetic field has not been detected while the high-frequency magnetic-field detection pulse signal SP0 is being output (step S12; No), it is determined whether an AC magnetic field has been detected while the AC magnetic-field detection pulses SP11 or the AC magnetic-field detection pulses SP12 are being output (step S13).

If it is determined in step S13 that an AC magnetic field has been detected while the AC magnetic-field detection pulses SP11 or the AC magnetic-field detection pulses SP12 are being output (step S13; Yes), the outputs of the AC magnetic-field detection pulses SP11 and the AC magnetic-field detection pulses SP12 are discontinued (step S24), the output of the normal driving-motor pulse K11 is discontinued (step S25), and the output of the rotation detecting pulses SP2 is discontinued (step S26). Thereafter, the correcting driving pulses P2+Pr are output (step S27).

Then, in order to cancel a residual magnetic flux accompanied by an application of the correcting driving pulses P2+Pr, demagnetizing pulses PE of the opposite polarity to the correcting driving pulses P2+Pr are output (step S28).

Subsequently, the duty ratio of the normal driving pulses K11 is set so that power consumption can be minimized and the correcting driving pulses P2+Pr are not output (step S29).

The process then returns to step S10, and processing similar to the above-described processing is repeated.

[1.4.3] Processing to be Performed when an AC Magnetic Field is not Detected While the AC Magnetic-field Detection Pulses SP11 or AC Magnetic-field Detection Pulses SP12 are Being Output If it is determined in step S13 that an AC magnetic field has not been detected while the AC magnetic-field detection pulses SP11 or the AC magnetic-field detection pulses SP12 are being output (step S13; No), the normal driving pulses K11 are output (step S14).

It is then determined whether the rotation of the pulse motor has been detected (step S15).

[1.4.4] Operation when the Rotation is not Detected

If it is determined in step S15 that the rotation of the pulse motor has not been detected, it is certain that the pulse motor is not rotated, and the correcting driving pulses P2+Pr are output (step S27).

Then, in order to cancel a residual magnetic flux accompanied by an application of the correcting driving pulses P2+Pr, demagnetizing pulses PE of the opposite polarity to the correcting driving pulses P2+Pr are output (step S28).

Subsequently, the duty ratio of the normal driving pulses K11 is set so that power consumption can be minimized and the correcting driving pulses P2+Pr are not output (step S29).

The process then returns to step S11, and processing similar to the above-described processing is repeated.

[1.4.5] Operation when the Rotation is Detected

If it is determined in step S11 that charging has been detected (step S11; Yes), the rotation detecting circuit is selected (step S30), and the normal driving pulses K11 are output (step S14).

Then, if it is found in step S15 that the rotation of the pulse motor has been detected, it is determined that the pulse motor has been rotated, and the output of the rotation detecting pulses SP2 is discontinued (step S16).

Subsequently, it is determined whether power generation for charging the storage device 104 has been detected by the charging detection circuit 102 (step S17).

[1.4.5.1] Operation in Detecting Power Generation After the Normal Driving Pulses are Output If it is determined in step S17 that power generation for charging the storage device 104 has been detected by the charging detection circuit 102 (step S17; Yes), the duty-reducing counter for lowering the duty ratio so as to reduce the effective power of the normal motor-driving pulses K11 is reset (set to a predetermined initial duty-reducing-counter value), or counting down of the duty-reducing counter is discontinued (step S19).

Then, the above-described correcting driving pulses P2+Pr are output (step S20), in which case, correcting driving pulses P3+Pr' having an effective power greater than that of the correcting driving pulses P2+Pr may be output.

The correcting driving pulses P3+Pr' may be output at a predetermined timing different from that of the correcting driving pulses P2+Pr. The correcting driving pulses are output when power generation has been detected in step S17 even though it is determined in step S15 that the pulse motor has been correctly rotated. The reason is as follows. If power generation is performed after the normal driving pulses are output in step S14, it cannot be determined in step S15 whether or not the rotation is correctly detected, and it may erroneously detected.

Then, in order to cancel a residual magnetic flux accompanied by an application of the correcting driving pulses P3+Pr', demagnetizing pulses PE' of the polarity opposite to the correcting driving pulses P3+Pr' are output (step S21).

Upon completion of outputting the demagnetizing pulses PE', the counting of the duty-reducing counter is restarted (step S22), and the duty ratio of the normal driving pulses K11 is set so that power consumption can be minimized and the correcting driving pulses P2+Pr and the correcting driving pulses P3+Pr' are not output.

The process then returns to step S10, and the processing similar to the above-described processing is repeated.

[1.4.5.2] Operation when Power Generation is not Detected

If it is determined in step S17 that power generation for charging the storage device 104 has not been detected by the generation detecting circuit 102 (step S17; No), in performing pulse-width control, the duty ratio of the normal driving pulses K11 is set so that power consumption can be minimized and the correcting driving pulses P2+Pr are not output (step S18).

The process then returns to step S10, and processing similar to the above-described processing is repeated.

[1.5] Example of Specific Operation

Figure 6:
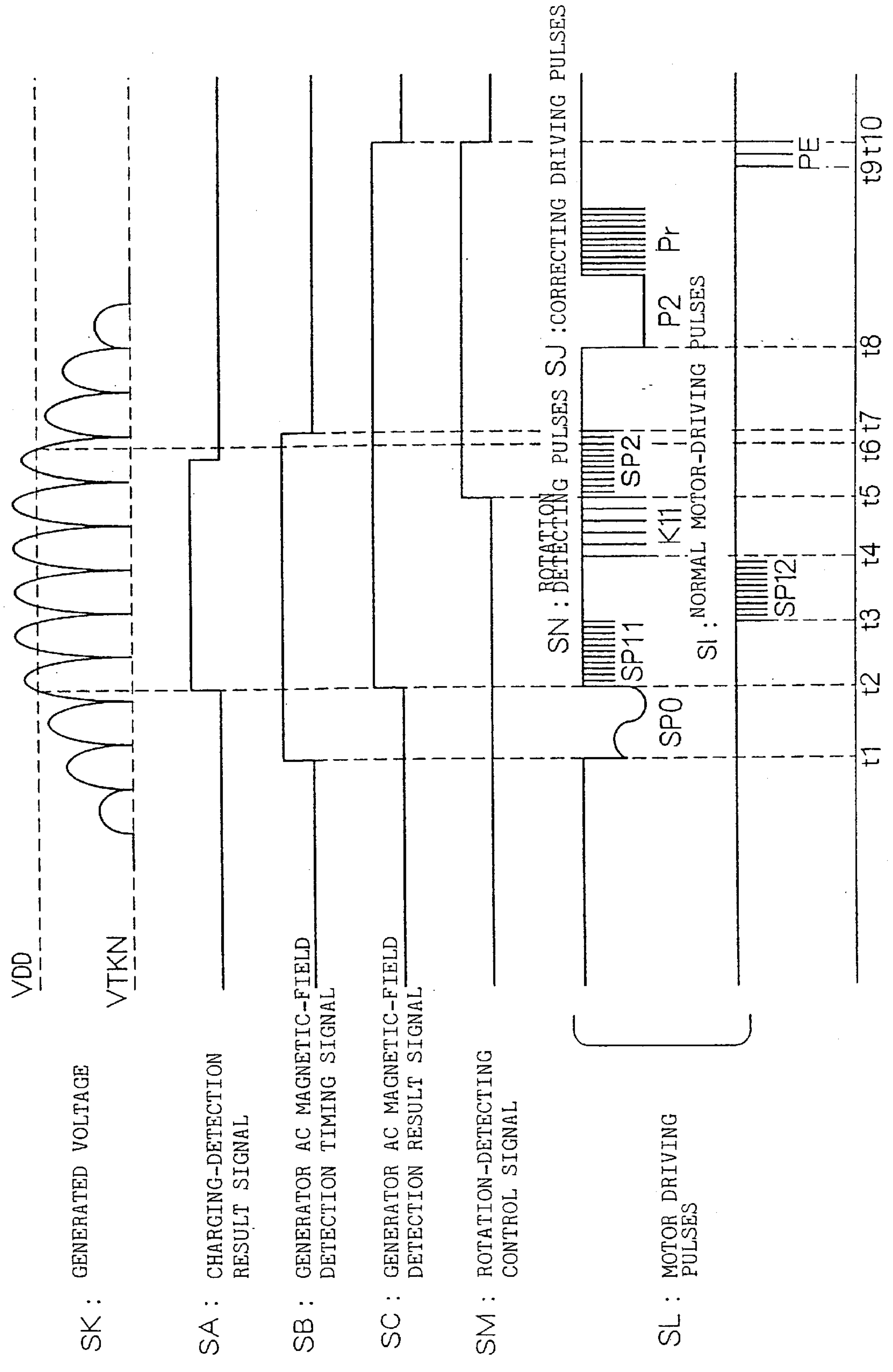
FIG. 6 is a timing chart of the first embodiment.

An example of the specific operation of the first embodiment is described below with reference to the timing chart of FIG. 6.

At time t1, when the generator AC magnetic-field detection timing signal SB becomes an "H" level, the high-frequency magnetic-field detection pulses SP0 are output from the motor driving circuit to the pulse motor 10.

Then, at time t2, the AC magnetic-field detection pulses SP11 having a first polarity are output from the motor driving circuit to the pulse motor 10.

In this case, if the generated voltage of the generator portion 101 exceeds the high-potential voltage VDD, the charging-detection result signal SA output from the charging detection circuit 102 becomes an "H" level, and the generator AC magnetic-field detection result signal SC becomes an "H" level.

Thereafter, at time t3, the AC magnetic-field detection pulses SP12 having a second polarity opposite to the first polarity are output, and at time t4, the output of the normal motor-driving pulses K11 is started.

Then, at time t5, since the generator AC magnetic-field detection result signal SC still remains at the "H" level, the rotation-detecting control circuit 113 changes the rotation-detecting control signal SM to an "H" level.

As a result, the induction voltage controllers 109A and 109B close (turn on) the switch SW for an input period (input timing) of the rotation-detecting pulse signal SN, i.e., a predetermined period (from time t5 to time t10 in FIG. 6) including the input period of the rotation detecting pulses SP2 based on the rotation-detecting control signal SM.

As a consequence, in the induction voltage controllers 109A and 109B, the impedance is decreased so as to shift the level of the induction voltage input into the rotation detecting circuit 112 to the no-rotation side, thereby reducing the influence of noise.

Thereafter, at time t6, when the generated voltage of the generator portion 101 becomes lower than the high-potential voltage VDD, the charging-detection result signal SA output from the charging detection circuit 102 becomes an "L" level.

Accordingly, at time t7, the generator AC magnetic-field detection result signal SC becomes an "L" level, and the output of the rotation detecting pulses SP2 is completed.

As described above, if a high-frequency magnetic field is detected during the period from time t1 to time t4, and if an AC magnetic field is detected during the period from time t2 to time t4, or if the rotation is not detected during the period from time t5 to time t7, the correcting driving pulses P2+Pr having an effective power greater than that of the normal driving pulses K11 are output at time t8 after the lapse of a predetermined period from the output start timing of the normal driving pulses K11 (corresponding to time t4).

Accordingly, the pulse motor 10 can be reliably driven.

When the correcting driving pulses P2+Pr are output, the output of demagnetizing pulses PE of the polarity opposite to the correcting driving pulses P2+Pr is started at time t9 in order to cancel a residual magnetic flux accompanied by an application of the correcting driving pulses P2+Pr.

Time t9 is set immediately before the subsequent external magnetic field is detected (the subsequent high-frequency magnetic-field detection pulses SP0 are output).

The pulse width of the demagnetizing pulses PE to be output is narrow (short) enough so as not to rotate the rotor, and a plurality of intermittent pulses (three pulses in FIG. 6) are provided to further enhance the demagnetizing effect.

At time t10, the generator AC magnetic-field detection result signal SC becomes an "L" level, and the output of the demagnetizing pulses PE is completed.

Concurrently, the rotation-detecting control signal SM also becomes an "L" level, and the switches SW of the induction voltage controller 109A and the induction voltage controller 109B are changed to the open state (turned off) so that the impedance of the induction voltage controller 109A and the induction voltage controller 109B becomes as high as that in the normal driving state.

As discussed above, in the rotation detecting period (time t5 to t7), the level of the induction voltage generated in the pulse motor 10 according to the input of the rotation detecting pulses SP2 is shifted to the no-rotation side.

Accordingly, even if the generation current generated by the power generation of the generator portion 101, and what is more, the voltage noise caused by the charging current in charging the storage device 104, are superimposed on the induction voltage, the erroneous detection of the rotation of the no-rotation pulse motor 10 can be prevented.

As a result, the pulse motor 10 can be reliably driven.

[1.6] Advantages of First Embodiment

As is seen from the foregoing description, according to the first embodiment, when charging is detected during the rotation detecting period of the rotation detecting circuit, the level of the induction voltage generated in the pulse motor upon inputting the rotation detecting pulses is shifted to the no-rotation state. Accordingly, the erroneous detection of the rotation of the no-rotation pulse motor can be prevented.

As a result, it is possible to ensure the reliable rotation of the pulse motor, and the time can be accurately indicated in a timepiece apparatus.

[1.7] Examples of Modifications to First Embodiment

[1.7.1] First Example of Modifications

In the foregoing description of the first embodiment, in the induction voltage controller 109A and the induction voltage controller 109B, the switch SW is turned on according to the rotation-detecting control signal SM so as to connect the first resistor R1 and the second resistor R2 in parallel with each other, whereby the combined impedance (resistance value) of the first resistor R1 and the second resistor R2 is controlled to be lower than the impedance (resistance value) of the first resistor R1.

Figure 7:
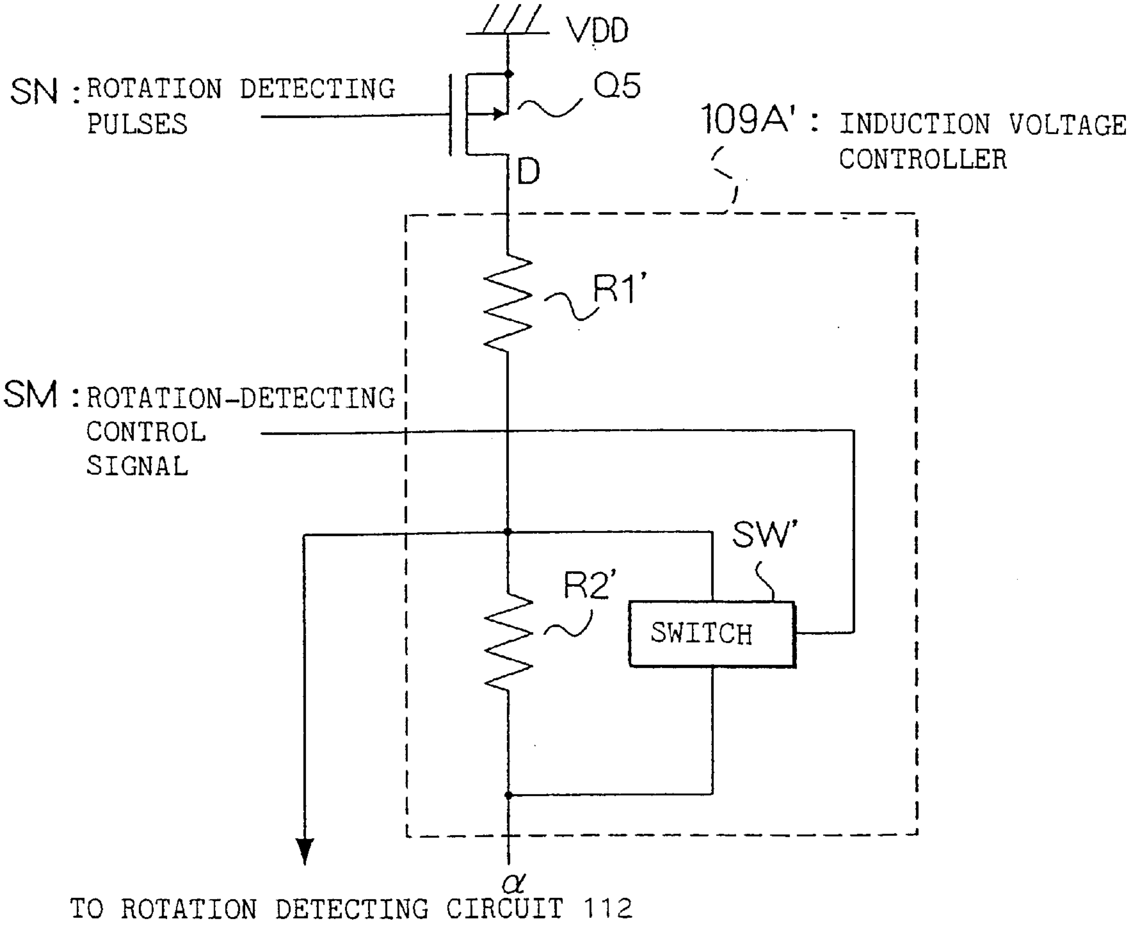
FIG. 7 is a schematic diagram illustrating another induction voltage controller.

In contrast, in an induction voltage controller 109A' of the first example of the modifications, a first resistor R1' and a second resistor R2' are connected in series to each other, as shown in FIG. 7, and a switch SW' is turned on according to the rotation-detecting control signal SM, thereby short-circuiting the terminals of the second resistor R2'.

Accordingly, the impedance (=R1) when the rotation is detected by the rotation detecting circuit 112 is controlled to be lower than the impedance (=R1'+R2') when the rotation is not detected.

According to the configuration of the first example of the modifications, advantages similar to those offered by the first embodiment can be obtained.

[1.7.2] Second Example of Modifications

In the first embodiment and the first example of the modifications, the impedance control is performed according to whether the resistances are combined. Alternatively, one or a plurality of impedance devices may be selected and connected to each other from a plurality of impedance devices (resistors).

[1.7.3] Third Example of Modifications

Figure 8:
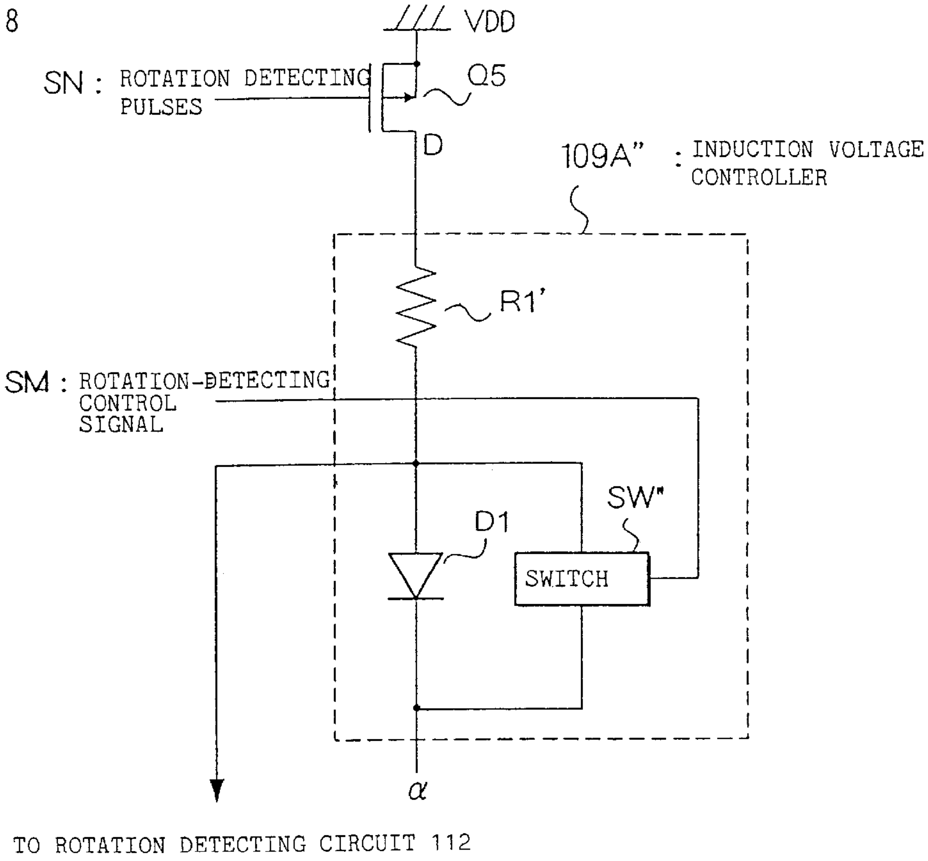
FIG. 8 is a schematic diagram illustrating still another induction voltage controller.

In the first embodiment and the individual examples of the modifications, the impedance itself is controlled. However, a chopper current generated by the rotation detecting pulses flows in the above-described impedance devices. Accordingly, a voltage drop device, such as a diode D1, is used instead of the second resistor R2' of the first example of the modifications and is connected in series to the resistor R1', as shown in FIG. 8, so as to turn on the switch SW" according to the rotation detecting control signal SM, thereby shorting-circuiting the terminals of the diode D1.

Thus, the induction voltage level when the rotation is detected by the rotation detecting circuit 112 is controlled to be lower than that when the rotation is not detected by a voltage equal to the voltage drop of the diode D1.

According to the configuration of the third example of the modifications, advantages similar to those offered by the first embodiment can be obtained.

[2] Second Embodiment

In the foregoing first embodiment, during the period in which the rotation of the pulse motor is detected by the rotation detecting circuit, the level of the induction voltage generated upon inputting the rotation detecting pulses is shifted to the no-rotation detecting side by reducing the impedance of the induction-voltage detection devices. In the second embodiment, however, the induction voltage level is shifted to the no-rotation detection side by controlling the duty ratio of the rotation detecting pulses.

[2.1] Principle of Second Embodiment

The principle of the second embodiment is first explained below with reference to FIG. 9.

Figure 9:
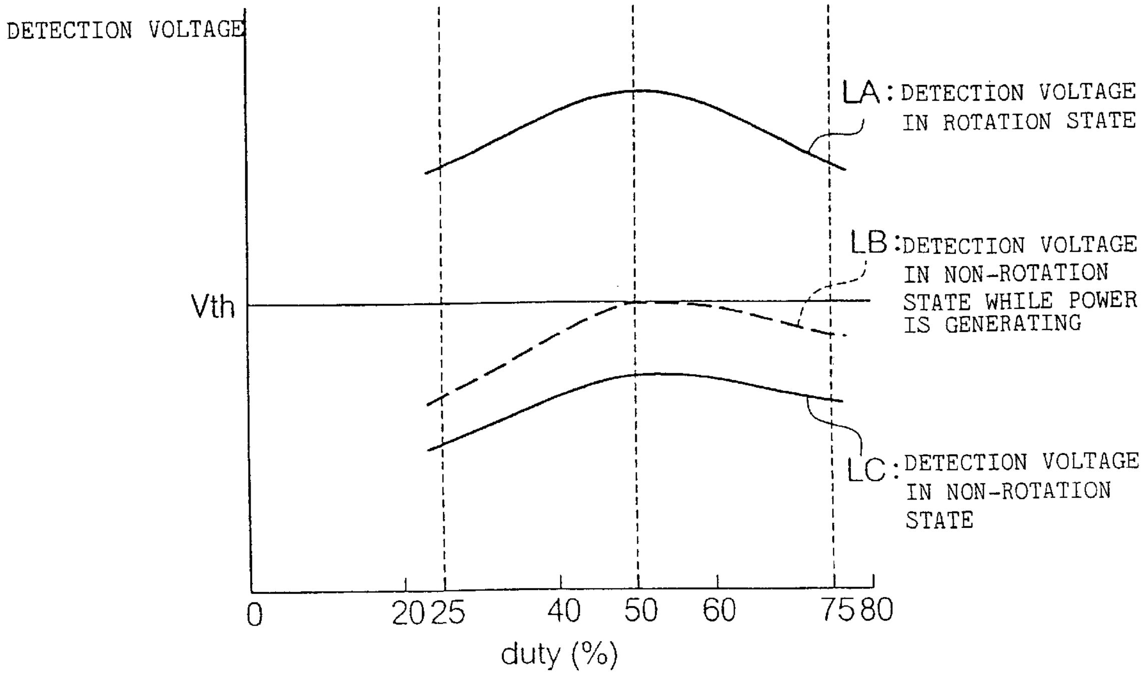
FIG. 9 illustrates the principle of a second embodiment.

FIG. 9 illustrates the relationship between the detection voltage (induction voltage) of the pulse motor upon inputting the rotation detecting pulses and the duty ratio [%] of the rotation detecting pulses.

In FIG. 9, sign Vth indicates the rotation reference voltage for determining whether the pulse motor is rotating.

FIG. 9 shows that the peak of the detection voltage (induction voltage) of the pulse motor occurs in the vicinity of a 50 [%] (=½) duty ratio of the rotation detecting pulses.

If the detection voltage (induction voltage) of the pulse motor is represented by a detection voltage curve LA in the rotation state or a detection voltage curve LC in the no-rotation state, it can be easily identified by the rotation reference voltage Vth whether or not the motor is rotated.

On the other hand, as indicated by a detection voltage curve LB in the no-rotation state obtained during power generation, the detection voltage (induction voltage) is shifted to a high level (rotation detecting side) because of a leakage magnetic flux caused by power generation.

As a result, the pulse motor is determined to be rotated even though it is not actually rotated, in which case, the time is indicated more slowly in the timepiece apparatus.

Thus, in the second embodiment, in order to reduce the occurrence of erroneous detection, the duty ratio in the rotation detecting period is set to be higher or lower than that in the normal driving period.

More specifically, in contrast to the duty ratio of 50 [%] (=½) in the normal driving period, the duty ratio in the rotation detecting period is set to be 25 [%] (=¼) or 75 [%] (=¾) so that the detection voltage is shifted to a low level (no-rotation detection side), thereby preventing an erroneous detection.

[2.2] Functional Configuration of Control System

The functional configuration of the control system of the second embodiment is described below with reference to FIG. 10.

Figure 10:
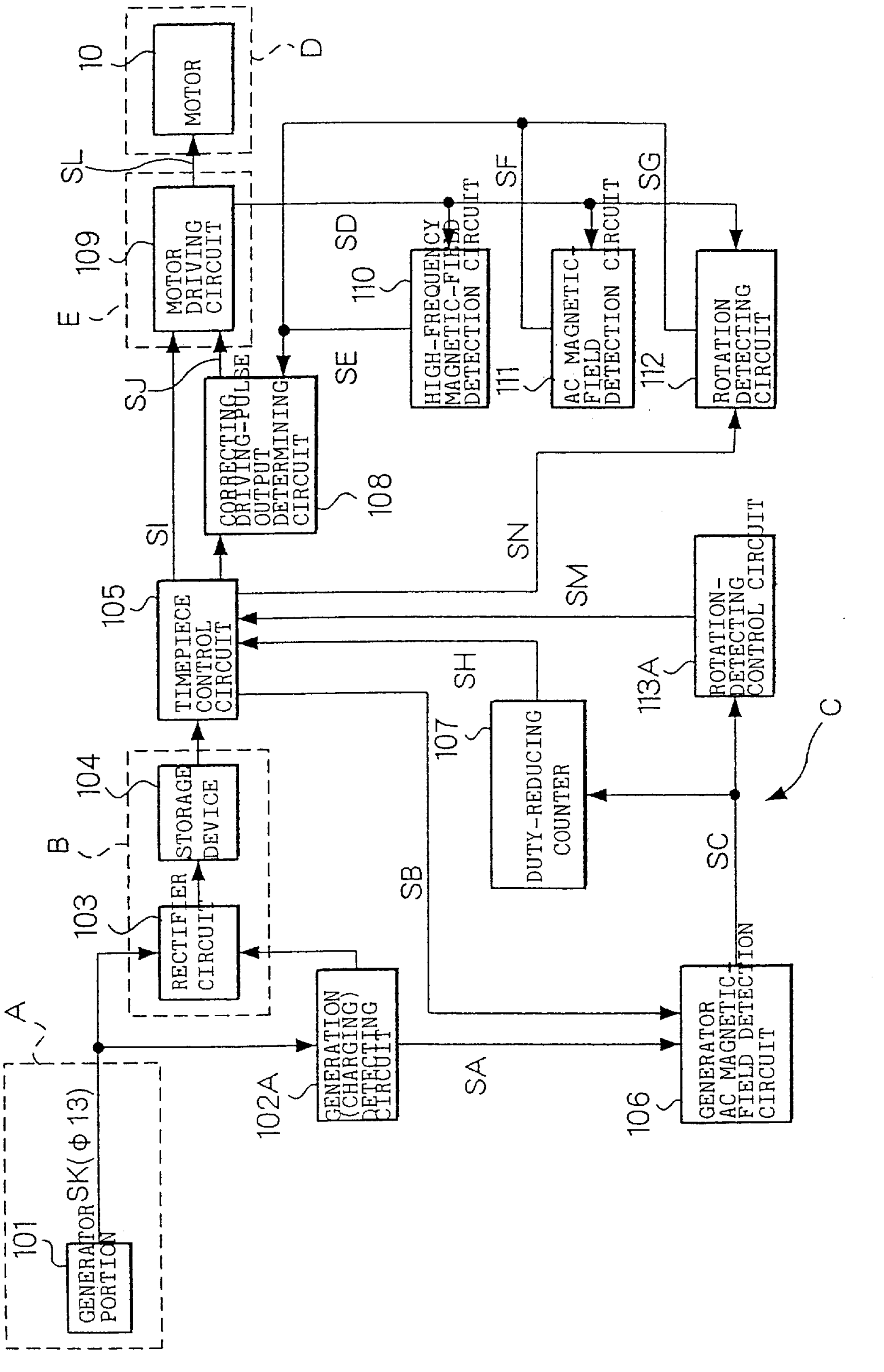
FIG. 10 is a block diagram illustrating the functional configuration of a timepiece apparatus of the second embodiment.

In FIG. 10, symbols A through E correspond to the generator unit A, the power supply unit B, the control unit C, the hand-moving mechanism D, and the driving unit E, respectively, shown in FIG. 1.

The timepiece apparatus 1 includes: a generator portion 101 for generating AC power; a charging detection circuit 102 for detecting charging based on a generated voltage SK of the generator portion 101 and for outputting a charging-detection result signal SA; a rectifier circuit 103 for rectifying an alternating current output from the generator portion 101 and for converting it to a direct current; a storage device 104 for storing the direct current from the rectifier circuit 103; and a timepiece control circuit 105, which is operated by the electric energy stored in the storage device 104, for outputting the normal motor-driving pulse signal SI for performing timepiece control and the rotation-detecting pulse signal SN used for rotation detection, and also outputting a generator AC magnetic-field detection timing signal SB for designating the detection timing of the generator AC magnetic field.

The timepiece apparatus 1 also includes: a generator AC magnetic-field detection circuit 106 for detecting the generator AC magnetic field based on the charging-detection result signal SA and the generator AC magnetic-field detection timing signal SB and for outputting a generator AC magnetic-field detection result signal SC; a duty-reducing counter 107 for outputting a normal-motor-driving-pulse duty-reducing signal SH for controlling the duty-reducing of the normal motor-driving pulses based on the generator AC magnetic-field detection result signal SC; and a correcting-driving-pulse output circuit 108 for determining whether a correcting driving pulse signal SJ is to be output, based on the generator AC magnetic-field detection result signal SC and for outputting the correcting driving pulse signal SJ if necessary.

The timepiece apparatus 1 further includes: a motor driving circuit 109 for outputting a motor driving pulse signal SL for driving the pulse motor 10, based on the normal motor-driving pulse signal SI or the correcting driving pulse signal SJ; a high-frequency magnetic-field detection circuit 110 for detecting a high-frequency magnetic field based on an induction voltage signal SD output from the motor driving circuit 109 and for outputting a high-frequency magnetic-field detection result signal SE; an AC magnetic-field detection circuit 111 for detecting an AC magnetic field based on the induction voltage signal SD output from the motor driving circuit 109 and for outputting an AC magnetic-field detection result signal SF; a rotation detecting circuit 112 for detecting whether the motor 10 is rotating based on the rotation-detecting pulse signal SN output from the timepiece control circuit 105 and the induction voltage signal SD output from the motor driving circuit 109 and for outputting a rotation-detecting result signal SG; and a rotation-detecting control circuit 113A for outputting a rotation-detecting control signal SM based on the generator AC magnetic-field detection result signal SC output from the generator AC magnetic-field detection circuit 106.

[2.3] Specific Operation

The overall of the operation of the second embodiment is similar to that of the first embodiment. Thus, an explanation thereof will be omitted, and the specific operation, in particular, the operation of the rotation-detecting control circuit 113A, is discussed below.

Figure 11:
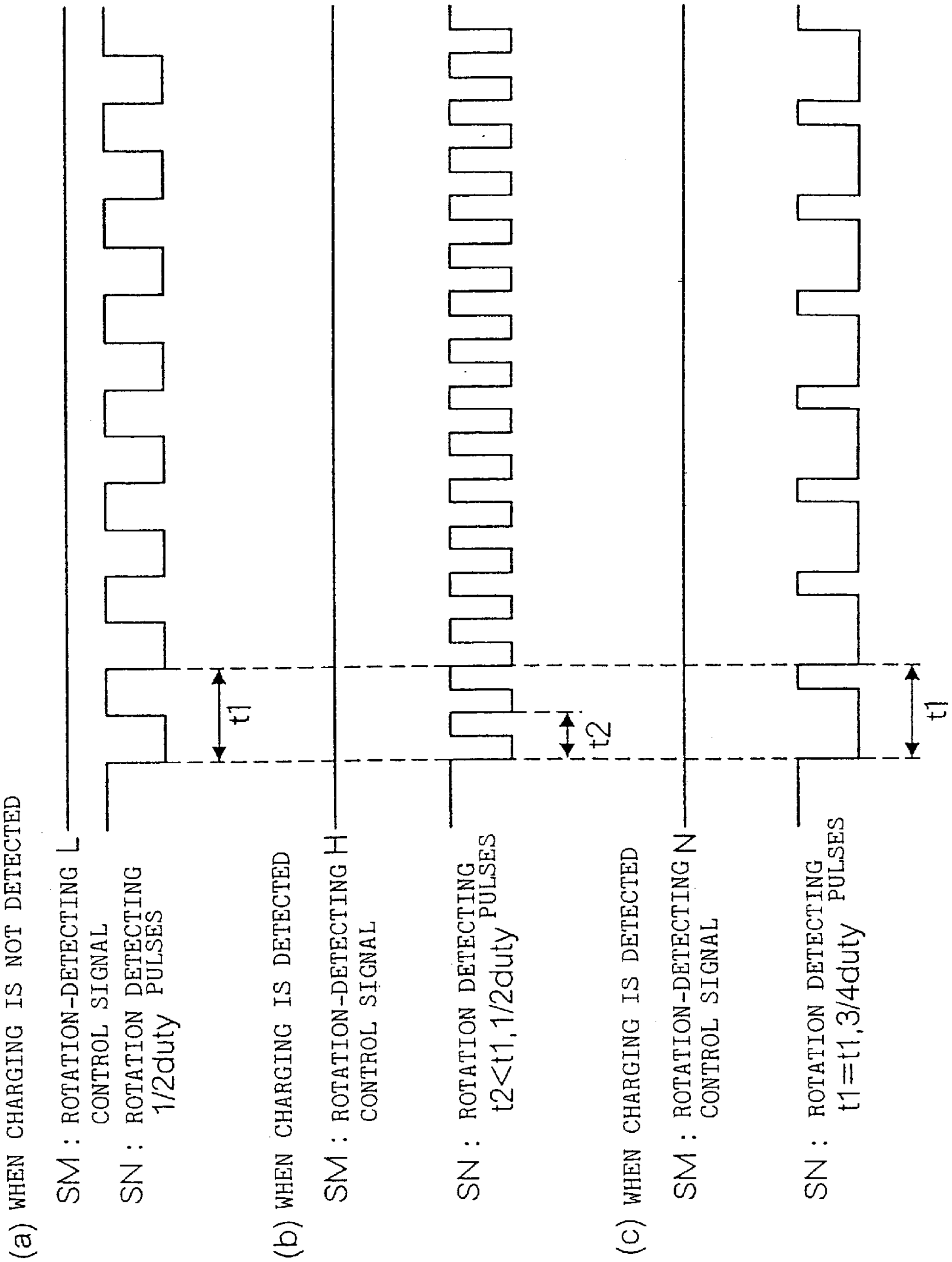
FIG. 11 is a timing chart illustrating the second embodiment.

FIG. 11 is a timing chart of the second embodiment.

FIG. 11(*a*) is a timing chart indicating the rotation-detecting control signal SM and the rotation-detecting pulse signal SN when charging is not detected in the charging detection circuit 102.

As is seen from FIG. 11(*a*), when charging is not detected, that is, the rotation-detecting control signal M is at an "L" level, the period of the rotation-detecting pulse signal SN is t1 having a 50 [%] (=½) duty ratio.

As a result, when the pulse motor is rotated, a detection voltage corresponding to the detection voltage curve LA in the rotation state at the 50 [%] duty ratio shown in FIG. 9 is obtained. When the pulse motor is not rotated, a detection voltage corresponding to the detection voltage curve LC in the no-rotation state at a duty ratio 50 [%] shown in FIG. 9 is obtained.

As a result, it can be easily detected whether or not the motor is rotated.

In contrast, when charging is detected, that is, the rotation-detecting control signal SM is at an "H" level, as shown in FIG. 11(*c*), the period of the rotation-detecting pulse signal SN is t1 having a 75 [%] (=¾) duty ratio.

As a result, when the pulse motor is rotated, a detection voltage corresponding to the detection voltage curve LA in the rotation state at the 75 [%] duty ratio is obtained. When the pulse motor is not rotated, a detection voltage corresponding to the detection voltage curve LB in the no-rotation state at the 75 [%] duty ratio is obtained.

As a consequence, in this case, too, it is easily detected whether or not the motor is rotated.

In the foregoing description, the duty ratio in the rotation detecting period is set to be higher than that in the normal driving period. It may be set to be lower than the duty ratio in the normal driving period as long as it makes it easy to identify whether or not the motor is rotated.

[2.4] Advantages of Second Embodiment

As discussed above, according to the second embodiment, in the rotation detecting period of the rotation detecting circuit, the duty ratio is set to be higher or lower than that in the normal driving period, so that the level of the induction voltage generated in the pulse motor upon the input of rotation detecting pulses is shifted to the no-rotation side. Thus, the erroneous detection of the rotation of the no-rotation pulse motor can be prevented.

As a result, it is possible to ensure the reliable rotation of the pulse motor, and the time is accurately indicated in a timepiece apparatus.

[2.5] Example of Modifications

In the foregoing second embodiment, in the rotation detecting period of the rotation detecting circuit, the duty ratio is set to be lower or higher than that in the normal driving period. However, as shown in FIG. 11(*b*), in the rotation detecting period of the rotation detecting circuit, the duty ratio may be unchanged, and the period t2 of the rotation detecting pulses may be set shorter than the period t1 of the rotation detecting pulses in the normal driving period. In this case, advantages similar to the above-described advantages can be obtained.

In other words, if the duty ratio is unchanged and if the frequency of the rotation detecting pulses is set higher than that in the normal driving period, the amplification factor of a chopper amplifier can be decreased, in which case, advantages similar to the above-described advantages can be obtained.

More specifically, if the frequency of the rotation detecting pulses in the normal driving period is 1 [kHz], the frequency of the rotation detecting pulses in the rotation detecting period of the rotation detecting circuit is increased to 2 [kHz].

[3] Third Embodiment

In the foregoing first and second embodiments, in the rotation detecting period of the pulse motor in the rotation detecting circuit, the level of the induction voltage generated upon the input of the rotation detecting pulses is shifted to the no-rotation detection side. In a third embodiment, however, the level of the induction voltage remains the same, and the voltage level of the rotation reference voltage (the rotation reference voltage Vth in the second embodiment) is shifted to the rotation detecting side so as to obtain advantages similar to the advantages offered by the first and second embodiments.

[3.1] Functional Configuration of Control System

The functional configuration of the third embodiment is discussed below with reference to FIG. 12.

Figure 12:
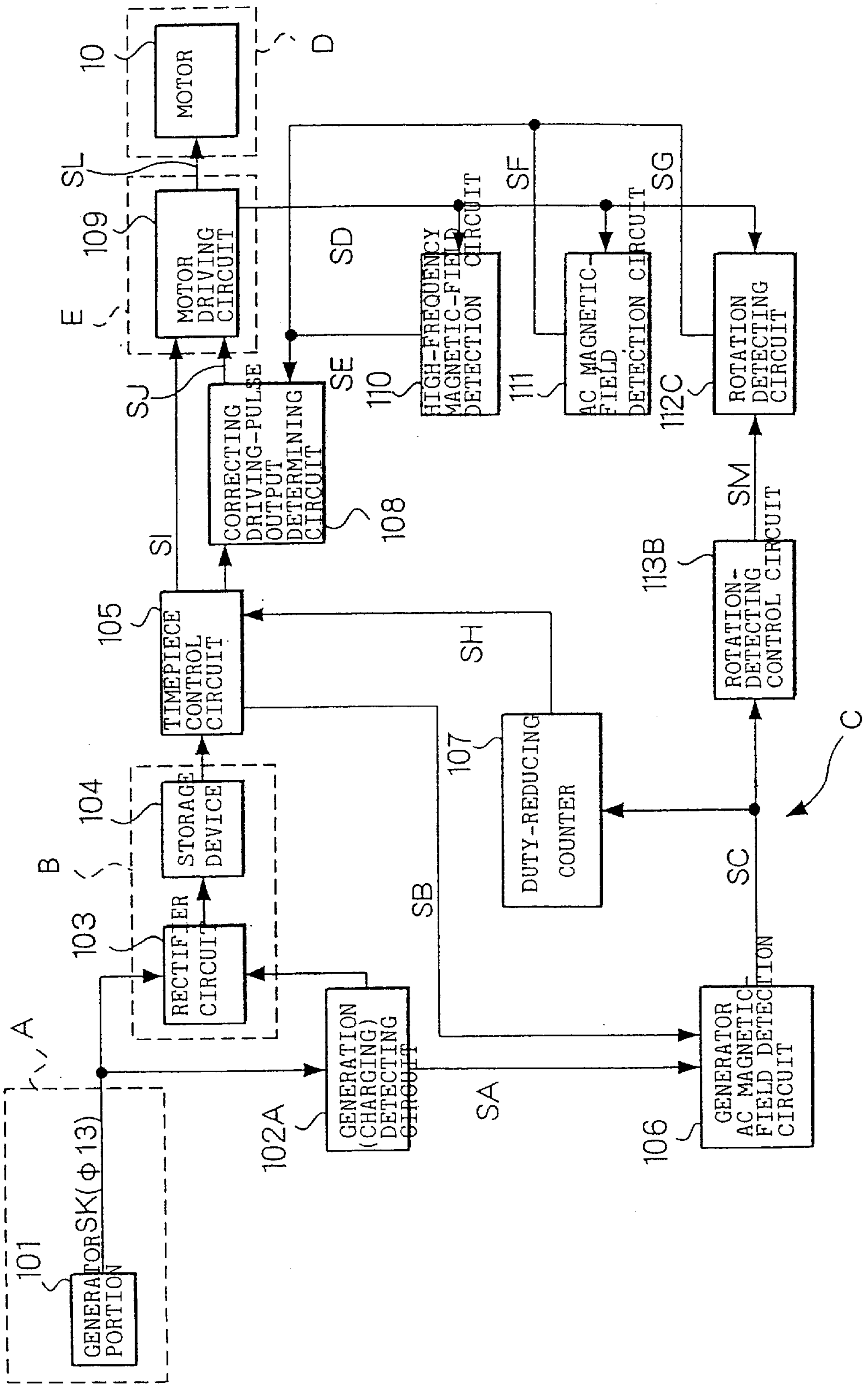
FIG. 12 is a block diagram illustrating the functional configuration of a timepiece apparatus of a third embodiment.

In FIG. 12, symbols A through E correspond to the generator unit A, the power supply unit B, the control unit C, the hand-moving mechanism D, and the driving unit E, respectively, shown in FIG. 1.

The timepiece apparatus 1 includes: a generator portion 101 for generating AC power; a charging detection circuit 102 for detecting charging based on a generated voltage SK of the generator portion 101 and for outputting a charging-detection result signal SA; a rectifier circuit 103 for rectifying an alternating current output from the generator portion 101 and for converting it to a direct current; a storage device 104 for storing the direct current output from the rectifier circuit 103; and a timepiece control circuit 105, which is operated by the electric energy stored in the storage device 104, for outputting the normal motor-driving pulse signal SI for performing timepiece control and also outputting a generator AC magnetic-field detection timing signal SB for designating the detection timing of the generator AC magnetic field.

The timepiece apparatus 1 also includes: a generator AC magnetic-field detection circuit 106 for detecting the generator AC magnetic field based on the charging-detection result signal SA and the generator AC magnetic-field detection timing signal SB and for outputting a generator AC magnetic-field detection result signal SC; a duty-reducing counter 107 for outputting a normal-motor-driving-pulse duty-reducing signal SH for controlling the duty-reducing of the normal motor-driving pulses based on the generator AC magnetic-field detection result signal SC; and a correcting-driving-pulse output circuit 108 for determining whether a correcting driving pulse signal SJ is to be output, based on the generator AC magnetic-field detection result signal SC, and for outputting the correcting driving pulse signal SJ if necessary.

The timepiece apparatus 1 further includes: a motor driving circuit 109 for outputting a motor driving pulse signal SL for driving the pulse motor 10, based on the normal motor-driving pulse signal SI or the correcting driving pulse signal SJ; a high-frequency magnetic-field detection circuit 110 for detecting a high-frequency magnetic field based on the induction voltage signal SD output from the motor driving circuit 109 and for outputting the high-frequency magnetic-field detection result signal SE; an AC magnetic-field detection circuit 111 for detecting an AC magnetic field based on the induction voltage signal SD output from the motor driving circuit 109 and for outputting the AC magnetic-field detection result signal SF; a rotation detecting circuit 112C for detecting whether the motor 10 is rotated based on the rotation-detecting control signal SM output from a rotation-detecting control circuit 113B, which will be described below, and the induction voltage signal SD output from the motor driving circuit 109, and for outputting the rotation-detecting result signal SG; and the rotation-detecting control circuit 113B for outputting the rotation-detecting control signal SM to the rotation detecting circuit 112C based on the generator AC magnetic-field detection result signal SC output from the generator AC magnetic-field detection circuit 106.

[3.2] Rotation Detecting Circuit

Figure 13:
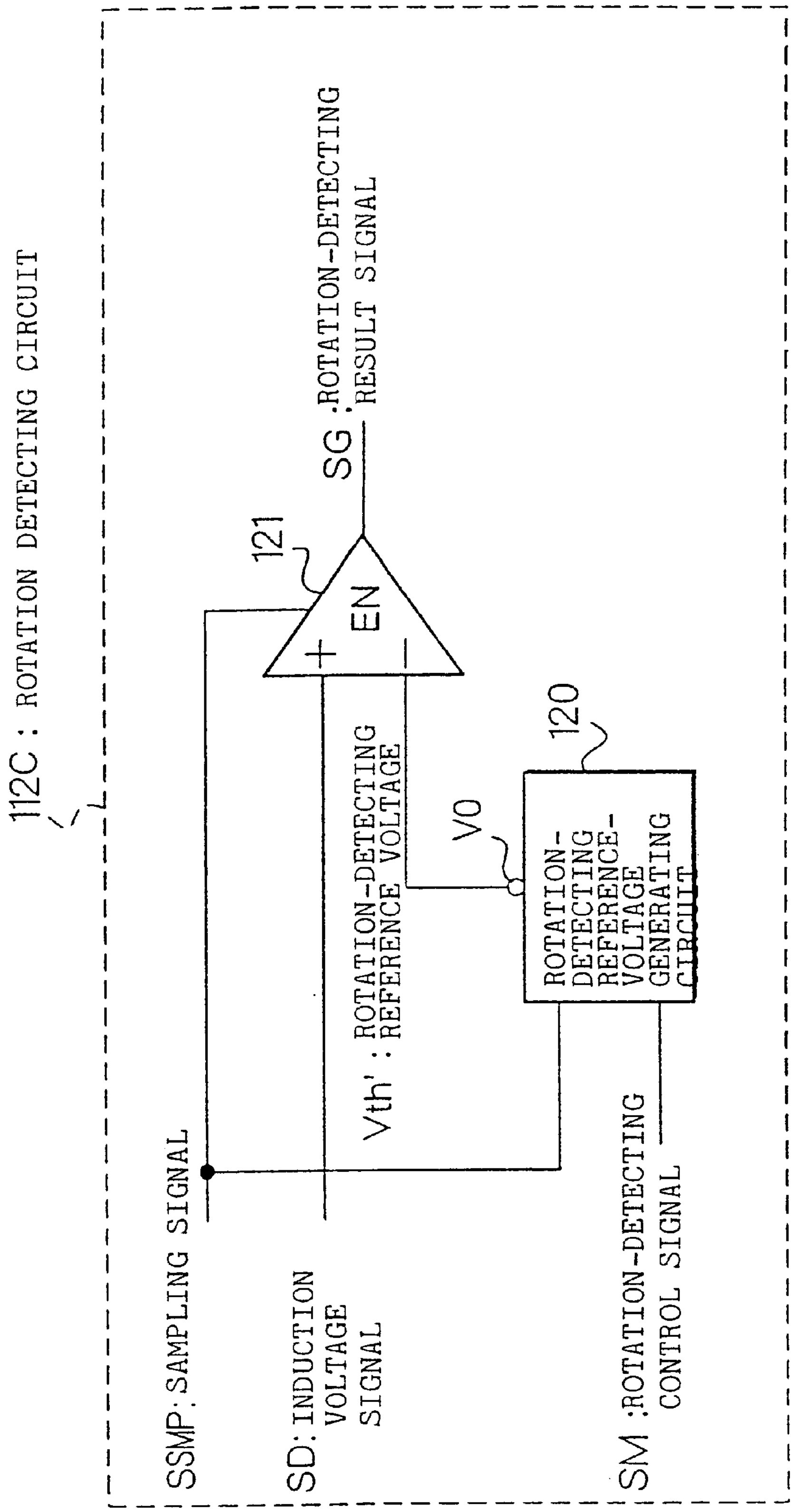
FIG. 13 is a block diagram illustrating the schematic configuration of a rotation detecting circuit.

FIG. 13 is a block diagram illustrating the circuit configuration of the rotation detecting circuit 112C.

The rotation detecting circuit 112C is formed of: a rotation-detecting reference-voltage generating circuit 120 for generating a rotation-detecting reference voltage Vth' having a predetermined voltage level, based on the rotation-detecting control signal SM, in synchronization with a sampling signal SSMP output from the timepiece control circuit 105, and for outputting the rotation-detecting reference voltage Vth'; and a comparator 121 for comparing the voltage level of the induction voltage signal SD with the voltage level of the rotation-detecting reference voltage Vth' in synchronization with the sampling signal SSMP input into an enable terminal EN and for outputting the rotation-detecting result signal SG.

Figure 19:
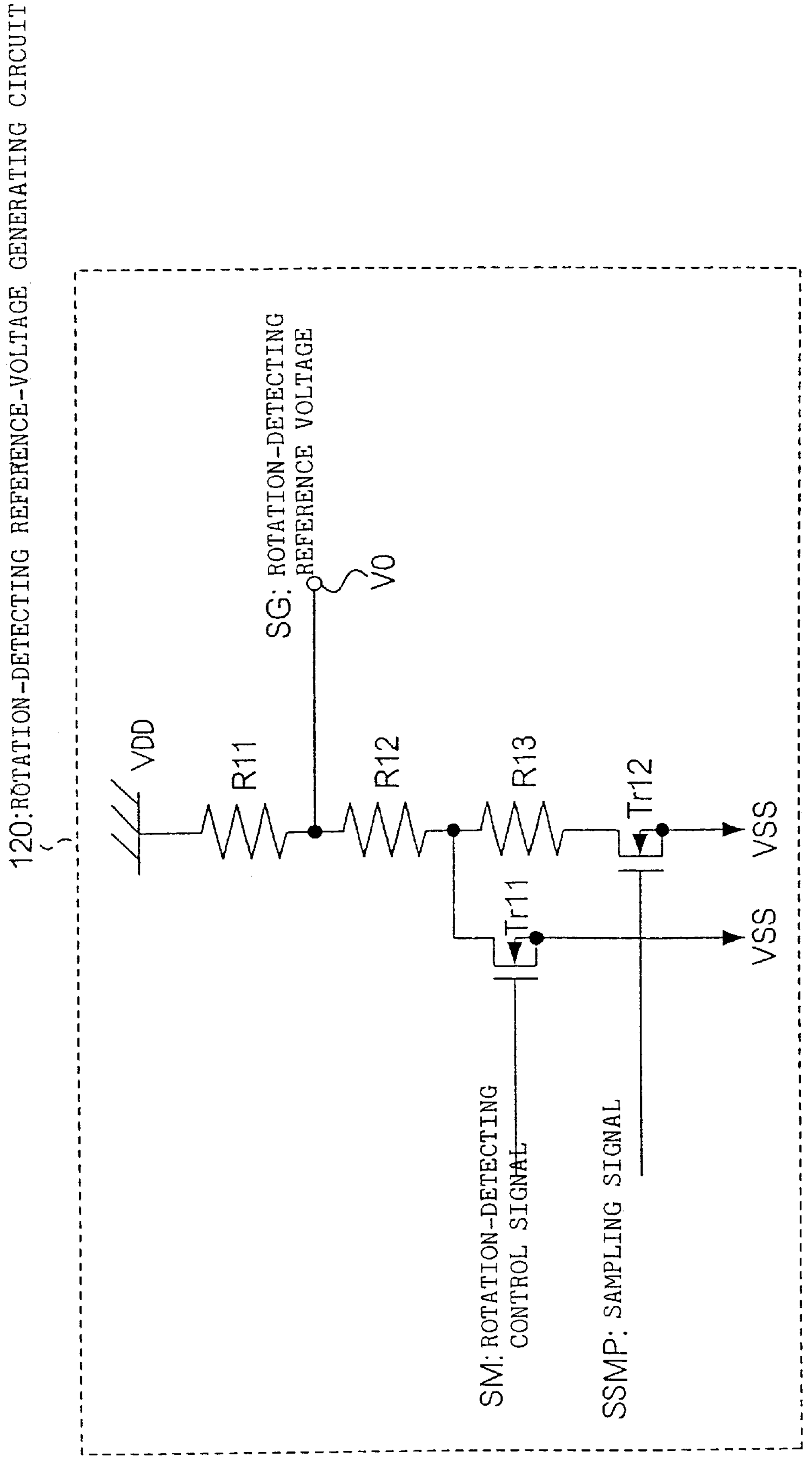
FIG. 19 is a diagram illustrating the detailed configuration of an example of a rotation-detecting reference-voltage generating circuit of the third embodiment.

FIG. 19 is a diagram illustrating the detailed configuration of the rotation-detecting reference-voltage generating circuit 120.

The rotation-detecting reference-voltage generating circuit 120 includes: resistors R11, R12, and R13 connected in series between a high-potential power supply VDD and a low-potential power supply VSS; an output terminal V0 connected to a node between the resistor R11 and the resistor R12 so as to output the rotation-detecting reference voltage SG; a rotation-reference-voltage switching transistor Tr11 whose drain is connected to a node between the resistor R12 and the resistor R13, whose source is connected to the low-potential power supply VSS, and whose gate receives the rotation-detecting control signal SM; and a switching transistor Tr12 whose drain is connected to the resistor R13, whose source is connected to the low-potential power supply VSS, and whose gate receives the sampling signal SSMP, so that the switching transistor Tr12 is turned on in synchronization with the sampling signal SSMP so as to activate the rotation-detecting reference-voltage generating circuit 120.

The operation of the rotation-detecting reference-voltage generating circuit 120 is discussed below with reference to FIG. 20.

For reducing power consumption, the rotation detecting comparator 121 and the rotation-detecting reference-voltage generating circuit 120 are driven by the sampling signal SSMP in the rotation detecting period.

Figure 20:
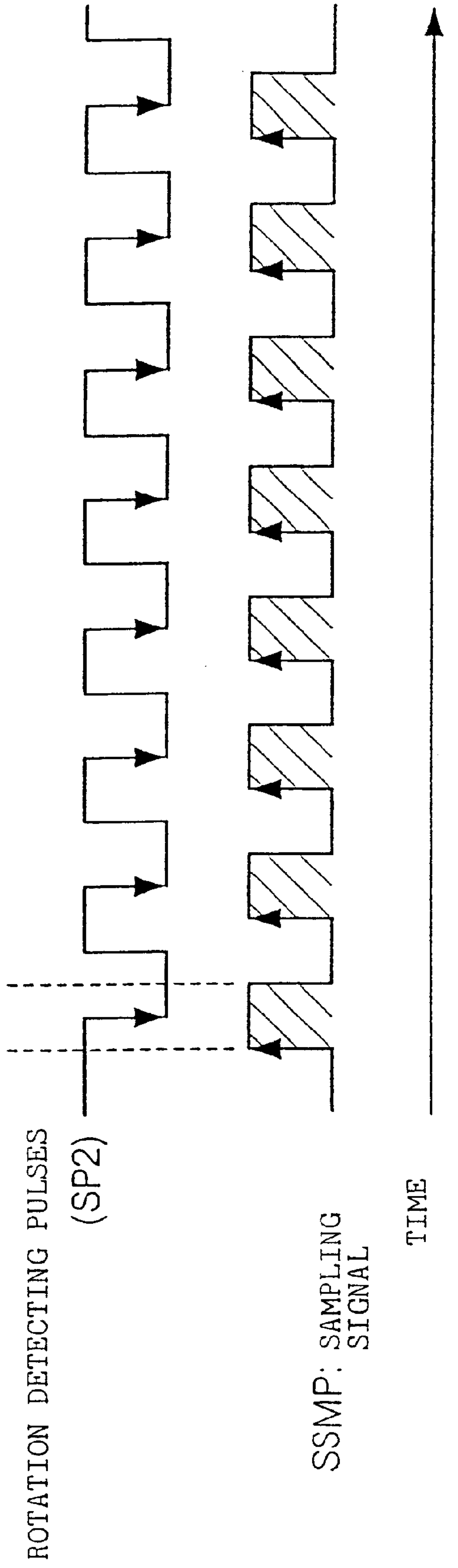
FIG. 20 is a timing chart illustrating a sampling signal.

More specifically, in FIG. 20, the sampling signal SSMP becomes an "H" level while the rotation detecting pulses SP2 are being shifted to the rotation detecting period in the transition timing from the "H" level to the "L" level. In the period in which the sampling signal SSMP is in the "H" level (indicated by the hatched portions in FIG. 20), the rotation-detecting reference-voltage generating circuit 120 is in the active state.

When the rotation-detecting control signal SM is at the "L" level (corresponding to the no-rotation state), the rotation-reference-voltage switching transistor Tr11 is in the off state, and the corresponding rotation-detecting reference voltage Vth' is expressed by equation (1). In equation (1) and equation (2), the resistance values of the resistors R11, R12, and R13 are represented by R11, R12, and R13, respectively, for convenience sake.

$$Vth'=Vth1'=VSS\times R11/(R11+R12+R13) \quad (1)$$

When the rotation-detecting control signal SM is in the "H" level (corresponding to the rotation detecting state), the rotation-reference-voltage switching transistor Tr11 is in the on state, and the corresponding rotation-detecting reference voltage Vth' is expressed by equation (2).

$$Vth'=Vth2'=VSS\times R11/(R11+R12) \quad (2)$$

Accordingly, the relationship between the rotation-detecting reference voltages Vth1' and Vth2' obtained when the rotation-detecting control signal SM is at the "L" level and the "H" level, respectively, is:

$$Vth1'<Vth2'.$$

In this case, the rotation-detecting reference-voltage generating circuit 120 shifts the voltage level of the rotation-detecting reference voltage Vth' to the rotation detecting side when charging is detected, unlike the voltage level of the rotation-detecting reference voltage Vth' when charging is not detected.

[3.3] Specific Operation

Figure 14:
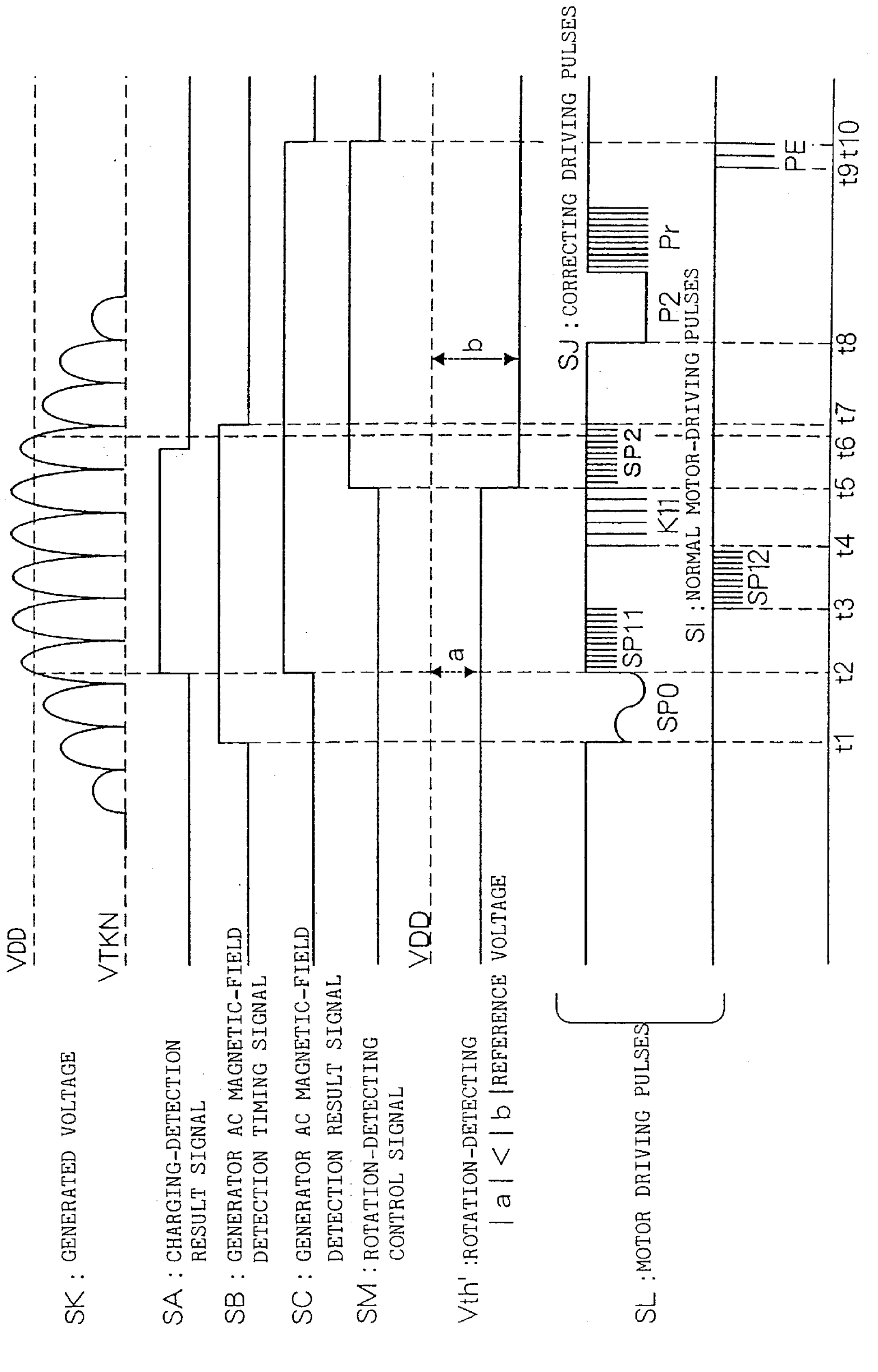
FIG. 14 is a timing chart of the third embodiment.

An example of the specific operation of the third embodiment is described below with reference to the timing chart of FIG. 14.

In the initial state, the rotation-detecting reference voltage Vth' is set to a [V] (high-potential VDD reference).

At time t1, when the generator AC magnetic-field detection timing signal SB becomes an "H" level, the high-frequency magnetic-field detection pulses SP0 are output from the motor driving circuit 109 to the pulse motor 10.

Then, at time t2, the AC magnetic-field detection pulses SP11 having a first polarity are output from the motor driving circuit to the pulse motor 10.

At time t2, if the generated voltage of the generator portion 101 exceeds the high-potential voltage VDD, the charging-detection result signal SA output from the charging detection circuit 102 becomes an "H" level, and the generator AC magnetic-field detection result signal SC becomes an "H" level.

Thereafter, at time t3, the AC magnetic-field detection pulses S12 having a second polarity, which is opposite to the first polarity, are output. At time t4, the output of the normal motor-driving pulses K11 is started.

Subsequently, since the generator AC magnetic-field detection result signal SC still remains at the "H" level, the rotation-detecting control circuit 113 changes the rotation-detecting control signal SM to the "H" level.

As a result, the rotation-detecting reference-voltage generating circuit 120 of the rotation detecting circuit 112C compares the voltage level of the rotation-detecting reference voltage Vth' with the voltage level (a [V]) when charging is not detected, based on the rotation-detecting control signal SM, and shifts the voltage level of the rotation-detecting reference voltage Vth' to the rotation detecting side, i.e., shifts the rotation-detecting reference voltage Vth' to the voltage level b [V] ($|a|<|b|$).

Then, the comparator 121 compares the voltage level of the induction voltage signal SD with the voltage level (b [V]) of the rotation-detecting reference voltage Vth', and outputs the rotation-detecting result signal SG.

Accordingly, the level of the induction voltage input into the rotation detecting circuit 112A becomes effectively equal to the voltage level which is shifted to the no-rotation side, thereby making it possible to reduce the influence of noise.

Thereafter, at time t6, when the generated voltage of the generator portion 101 becomes lower than the high-potential voltage VDD, the charging-detection result signal SA output from the charging detection circuit 102 becomes an "L" level.

Accordingly, at time t7, the generator AC magnetic-field detection result signal SC becomes an "L" level, and the output of the rotation detecting pulses SP2 is also completed.

As described above, if a high-frequency magnetic field is detected during the period from time t1 to time t2, or if an AC magnetic field is detected during the period from time t2 to time t4, or if the rotation is not detected during the period from time t5 to time t7, the correcting driving pulses P2+Pr having an effective power greater than that of the normal driving pulses K11 are output at time t8 after the lapse of a predetermined period from the output start timing of the normal driving pulses K11 (corresponding to time t4).

Accordingly, the pulse motor 10 can be reliably driven.

When the correcting driving pulses P2+Pr are output, the output of demagnetizing pulses PE of the polarity opposite to the correcting driving pulses P2+Pr is started at time t9 in order to cancel a residual magnetic flux accompanied by an application of the correcting driving pulses P2+Pr.

At time t10, the generator AC magnetic-field detection result signal SC becomes an "L" level, and the output of the demagnetizing pulses PE is completed.

Concurrently, the rotation-detecting control signal SM also becomes an "L" level, and the switches SW of the induction voltage controller 109A and the induction voltage controller 109B are changed to the open state (turned off) so that the rotation-detecting reference-voltage generating circuit 120 of the rotation detecting circuit 112A returns, based on the rotation-detecting control signal SM, the voltage level of the rotation-detecting reference voltage Vth' to the voltage level (a [V]) when charging is not detected.

As is seen from the foregoing description, in the rotation detecting period (time t5 to t7), the rotation-detecting reference voltage Vth' to be compared with the voltage level of the induction voltage generated in the pulse motor 10 upon the input of the rotation detecting pulses SP2 is shifted to the rotating side.

As a consequence, even if the generation current generated by power generation of the generator portion 101, and what is more, the voltage noise caused by the charging current generated when the storage device 104 is charged, are superimposed on the induction voltage, it is possible to prevent the erroneous detection of the rotation of the no-rotation pulse motor 10.

As a result, the pulse motor 10 can be reliably driven.

[3.4] Advantages of the Third Embodiment

As discussed above, according to the third embodiment, in the rotation detecting period of the rotation detecting circuit 112C, the rotation-detecting reference voltage to be compared with the level of the induction voltage generated in the pulse motor upon the input of the rotation detecting pulses is shifted to the rotating side. It is thus possible to prevent the erroneous detection of the rotation of the no-rotation pulse motor 10.

It is thus possible to ensure the reliable rotation of the pulse motor, and the time is accurately indicated in a timepiece apparatus.

[4] Fourth Embodiment

In the foregoing embodiments, the level of the induction voltage generated in detecting the rotation relative to the rotation-detecting reference voltage is shifted. In a fourth embodiment, however, free vibrations of the no-rotation rotor of a pulse motor are inhibited so as to suppress the induction voltage level when the rotor is not rotated, thereby easily identifying whether or not the pulse motor is rotated.

[4.1] Functional Configuration of Control System

A description is given below of the functional configuration of a control system of the fourth embodiment with reference to FIG. 15.

Figure 15:
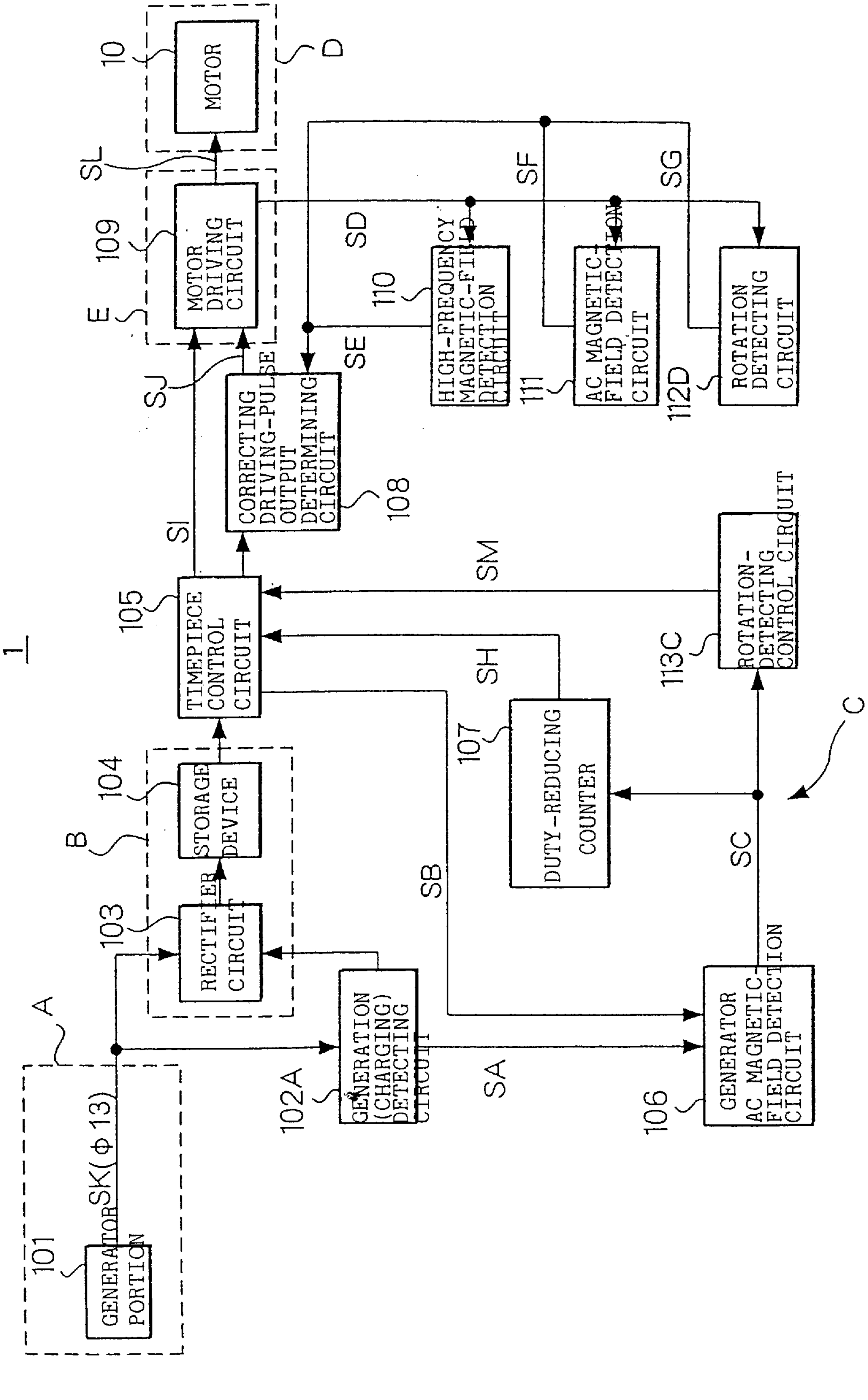
FIG. 15 is a block diagram illustrating the functional configuration of a timepiece apparatus of a fourth embodiment.

In FIG. 15, symbols A through E correspond to the generator unit A, the power supply unit B, the control unit C, the hand-moving mechanism D, and the driving unit E, respectively, shown in FIG. 1.

The timepiece apparatus 1 includes: a generator portion 101 for generating AC power; a charging detection circuit 102 for detecting charging based on a generated voltage SK of the generator portion 101 and for outputting a charging-detection result signal SA; a rectifier circuit 103 for rectifying an alternating current output from the generator portion 101 and for converting it to a direct current; a storage device 104 for storing the direct current output from the rectifier circuit 103; and a timepiece control circuit 105, which is operated by the electric energy stored in the storage device 104, for outputting the normal motor-driving pulse signal SI for performing timepiece control and also for outputting a generator AC magnetic-field detection timing signal SB for designating the detection timing of the generator AC magnetic field.

The timepiece apparatus 1 also includes: a generator AC magnetic-field detection circuit 106 for detecting a generator AC magnetic field based on the charging-detection result signal SA and the generator AC magnetic-field detection timing signal SB and for outputting the generator AC magnetic-field detection result signal SC; a duty-reducing counter 107 for outputting the normal-motor-driving-pulse duty-reducing signal SH for performing duty-reducing control of the normal motor-driving pulses based on the generator AC magnetic-field detection result signal SC; and a correcting-driving-pulse output circuit 108 for determining whether the correcting driving pulse signal SJ is to be output, based on the generator AC magnetic-field detection result signal SC, and for outputting the correcting driving pulse signal SJ if necessary.

The timepiece apparatus 1 further includes: a motor driving circuit 109 for outputting the motor driving pulse signal SL for driving the pulse motor 10, based on the normal motor-driving pulse signal SI or the correcting driving pulse signal SJ; a high-frequency magnetic-field detection circuit 110 for detecting a high-frequency magnetic field based on the induction voltage signal SD output from the motor driving circuit 109 and for outputting the high-frequency magnetic-field detection result signal SE; an AC magnetic-field detection circuit 111 for detecting an AC magnetic field based on the induction voltage signal SD output from the motor driving circuit 109 and for outputting the AC magnetic-field detection result signal SF; a rotation detecting circuit 112D for detecting whether the motor 10 is rotating based on the rotation-detecting control signal SM output from a rotation-detecting control circuit 113C, which will be described below, and the induction voltage signal SD output from the motor driving circuit 109, and for outputting the rotation-detecting result signal SG; and the rotation-detecting control circuit 113C for outputting the rotation-detecting control signal SM to the timepiece control circuit 105 based on the generator AC magnetic-field detection result signal SC output from the generator AC magnetic-field detection circuit 106.

[4.2] Specific Operation

Figure 16:
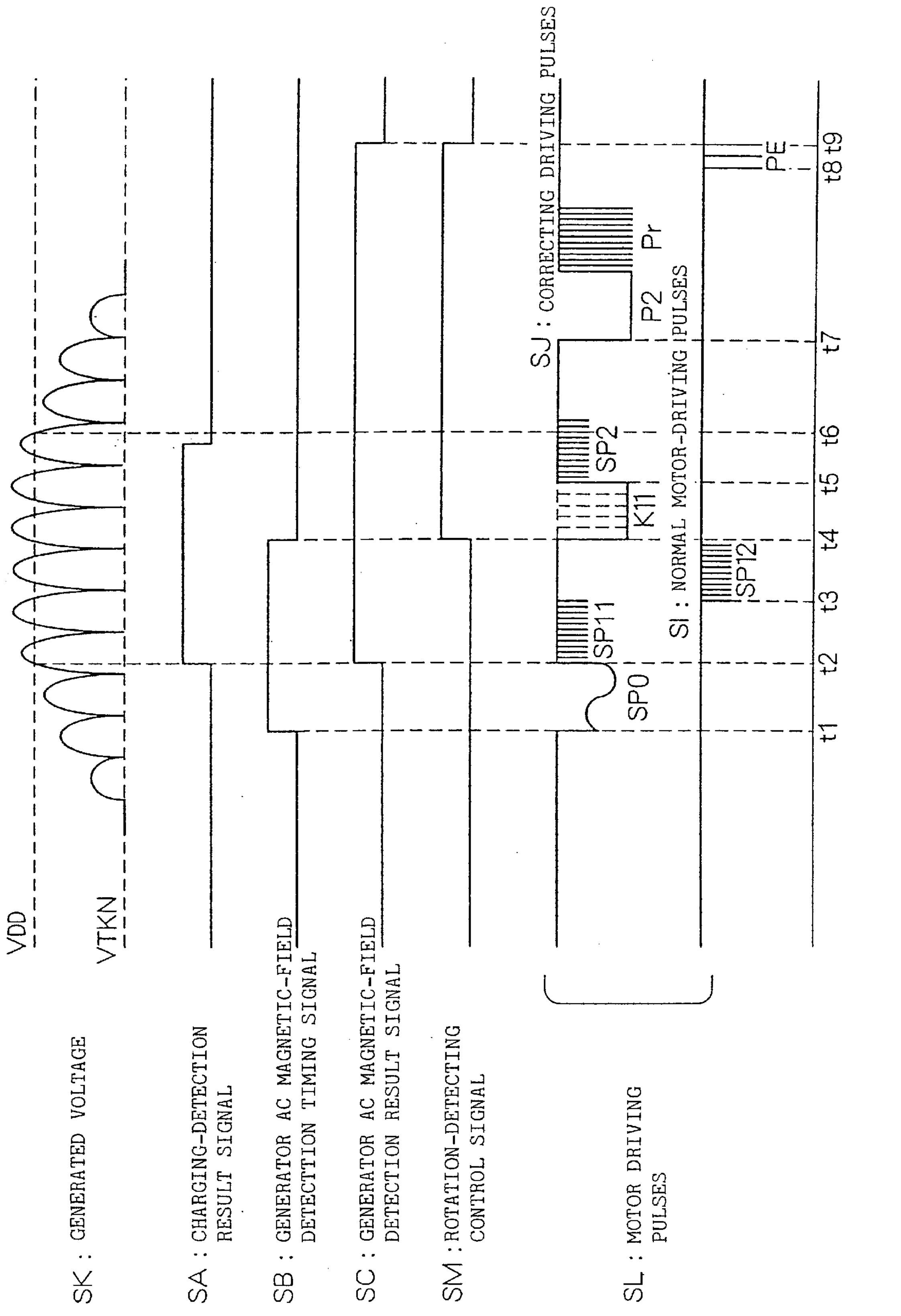
FIG. 16 is a timing chart of the fourth embodiment.

An example of the specific operation of the fourth embodiment is now described with reference to the timing chart of FIG. 16.

In the normal driving period, the waveform of the normal motor-driving pulse signal is formed of a plurality of pulses in a saw-tooth shape. Such a waveform is hereinafter referred to as a "saw-tooth waveform".

At time t1, when the generator AC magnetic-field detection timing signal SB becomes an "H" level, the high-frequency magnetic-field detection pulses SP0 are output from the motor driving circuit to the pulse motor 10.

Then, at time t2, the AC magnetic-field detection pulses SP11 having a first polarity are output from the motor driving circuit to the pulse motor 10.

In this case, if the generated voltage of the generator portion 101 exceeds the high-potential voltage VDD, the charging-detection result signal SA output from the charging detection circuit 102 becomes an "H" level, and the generator AC magnetic-field detection result signal SC becomes an "H" level.

Thereafter, at time t3, the AC magnetic-field detection pulses SP12 having a second polarity, which is opposite to the first polarity, are output.

At time t4, when the generator AC magnetic-field detection timing signal SB becomes an "L" level, the rotation-detecting control circuit 113C changes the rotation-detecting control signal SM to the "H" level.

As a result, the timepiece control circuit 105 shifts the waveform of the normal motor-driving pulse signal from the saw-tooth waveform (indicated by the one-dot chain lines in FIG. 16) to the rectangular waveform (indicated by the solid lines in FIG. 16) having the same pulse output period as that of the saw-tooth waveform.

This makes it possible to raise the peak value of the current flowing into the oil forming the pulse motor 10, thereby increasing the current falling time after the application of the normal motor-driving pulse signal.

During the current falling time, the rotor forming the pulse motor 10 is not rotated so as to inhibit the motion to return to the stable point by a togging torque. It is thus possible to suppress the induction voltage level in the no-rotation period.

Figure 17:
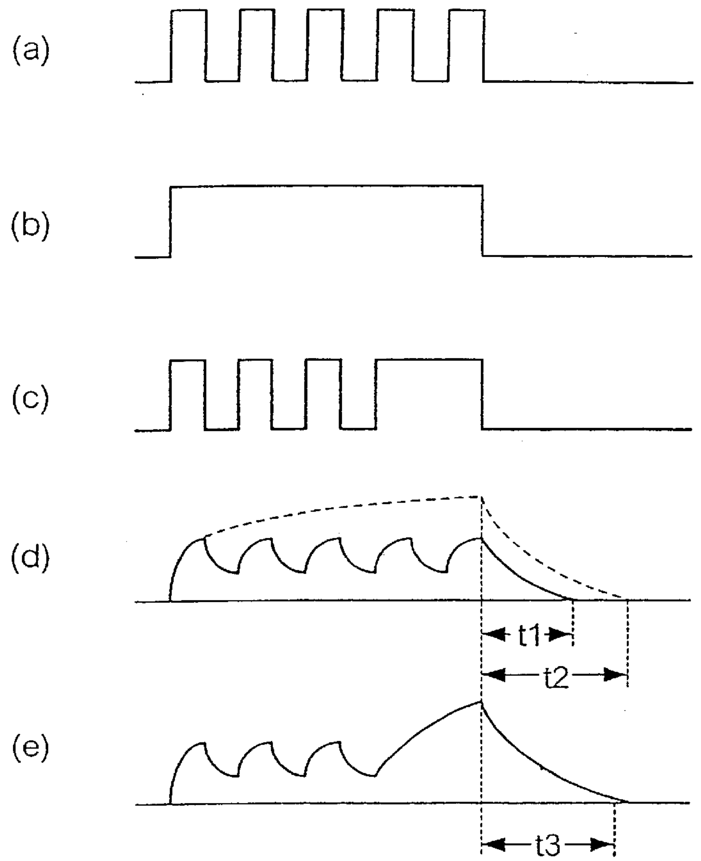
FIG. 17 illustrates the operation of the fourth embodiment.

More specifically, the normal motor-driving pulse signal having a saw-tooth waveform shown in FIG. 17(*a*) is changed to the normal motor-driving pulse signal having a rectangular waveform shown in FIG. 17(*b*). Accordingly, the current falling time t1 after the application of the normal motor-driving pulse signal is increased to t2, as shown in FIG. 17(*d*), thereby stopping the rotation of the rotor forming the pulse motor 10. Thus, the motion to return to the stable point by a cogging torque is greatly inhibited, thereby suppressing the induction voltage level when the motor is not rotated.

Thereafter, at time t5, the rotation detecting circuit 112D detects the rotation based on the rotation detecting pulses SP2, in which case, the level of the induction voltage input into the rotation detecting circuit 112D is shifted to the no-rotation side according to the current falling time. It is thus possible to reduce the influence of noise.

As discussed above, if a high-frequency magnetic field is detected in the period from time t1 to t2, or if an AC magnetic field is detected in the period from time t2 to t4, or if the rotation is not detected in the period from time t5 to t6, the correcting driving pulses P2+Pr having an effective power greater than that of the normal driving pulses K11 are output at time t7 after the lapse of a predetermined period from the output start timing of the normal driving pulses K11 (corresponding to time t4).

Thus, the pulse motor 10 can be reliably driven.

When the correcting driving pulses P2+Pr are output, the output of demagnetizing pulses PE of the polarity opposite to the correcting driving pulses P2+Pr is started at time t8 in order to cancel a residual magnetic flux accompanied by the application of the correcting driving pulses P2+Pr.

At time t9, the generator AC magnetic-field detection result signal SC becomes an "L" level, and the output of the demagnetizing pulses PE is completed.

Concurrently, the rotation-detecting control signal SM also becomes an "L" level.

As is seen from the foregoing description, in the charging detection period, since the waveform of the normal motor-driving pulses K11 is changed from a saw-tooth waveform to a rectangular waveform, the rotation of the rotor forming the pulse motor 10 is discontinued, and the motion to return to the stable point by a cogging torque is inhibited. As a result, the effective induction voltage level in the no-rotation period is shifted to the no-rotation side.

As a consequence, even if the generation current generated by power generation of the generator portion 101, and what is more, the voltage noise caused by the charging current generated when the storage device 104 is charged, are superimposed on the induction voltage, it is possible to prevent the erroneous detection of the rotation of the no-rotation pulse motor 10.

As a result, the pulse motor 10 can be reliably driven.

[4.3] Advantages of Fourth Embodiment

As discussed above, according to the fourth embodiment, in the rotation detecting period of the rotation detecting circuit, the waveform of the normal motor-driving pulses K11 is changed from a saw-tooth waveform to a rectangular waveform. Accordingly, the rotation of the rotor forming the pulse motor 10 is discontinued, and electromagnetic braking is applied to the motion to return to the stable point by a cogging torque, thereby shifting the effective induction voltage level in the no-rotation period to the no-rotation side. It is thus possible to prevent the erroneous detection of the rotation of the no-rotation pulse motor.

As a result, the reliable rotation of the pulse motor can be ensured, and the time can be accurately indicated in a timepiece apparatus.

[4.4] Modification Examples

[4.4.1] First Example of Modifications

In the above description, the waveform of the normal motor-driving pulses K11 is changed from a saw-tooth waveform to a rectangular waveform. Instead of changing the waveform of the normal motor-driving pulse signal to the rectangular waveform shown in FIG. 17(*b*), the width of the last pulse of the normal motor-driving pulses K11 having a saw-tooth waveform is lengthened, as shown in FIG. 17(*c*). Accordingly, the current falling time t1 after the application of the normal motor-driving pulse signal can be increased to time t3 (<t2), as shown in FIG. 17(*e*). This interrupts the rotation of the rotor forming the pulse motor 10, and strong electromagnetic braking is also applied to the motion to return to the stable point by a cogging torque, thereby suppressing the induction voltage level in the no-rotation period.

[4.4.2] Second Example of Modifications

According to the above description, the rotation detecting pulses SP2 are output immediately after the normal motor-driving pulses K11 are output. However, the rotation detecting pulses SP2 may be output after the lapse of a predetermined period from the output of the normal motor-driving pulses K11, and the coil forming the pulse motor 10 may be set in the closed loop state during the predetermined period. This also makes it possible to apply electromagnetic braking, and advantages similar to the above-described advantages can be obtained.

[5] Fifth Embodiment

In the foregoing embodiments, a detection delay of the generation detecting circuit is not considered. In a fifth embodiment, however, a detection delay of the generation detecting circuit is taken into consideration so as to prevent a detection leakage based on the detection delay.

The functional configuration of the control system of the fifth embodiment is similar to that of the fourth embodiment shown in FIG. 12, except that a generation detecting circuit 12E is used instead of the generation detecting circuit of the fourth embodiment. A detailed explanation will thus be omitted.

[5.1] Configuration of Circuits Located Close to Generation Detecting Circuit

Figure 18:
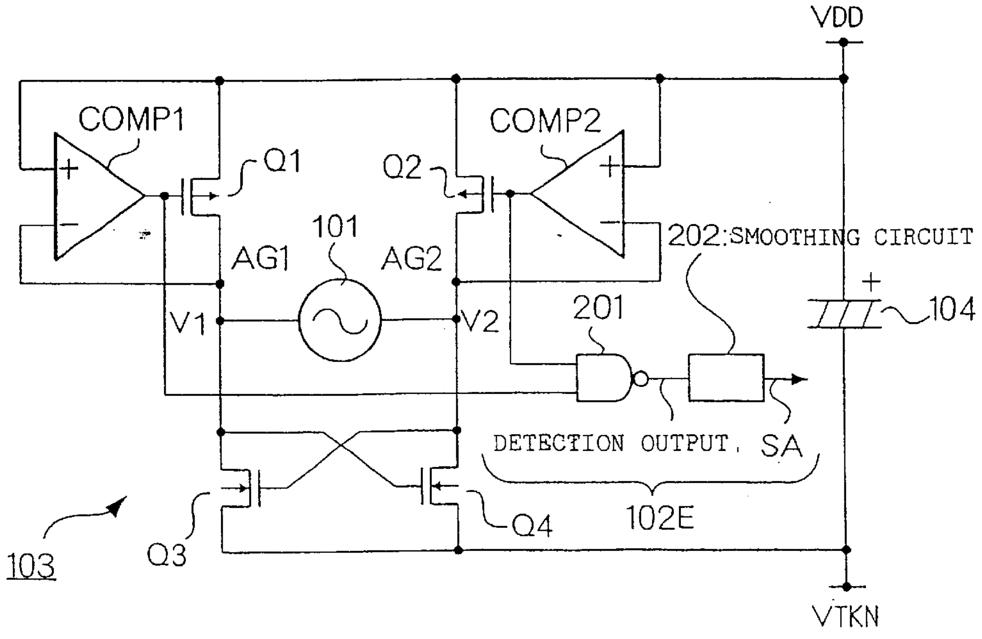
FIG. 18 is a diagram illustrating the portion close to a generation detecting circuit of a fifth embodiment.

An example of the configuration of the circuits located close to the generation detecting circuit which causes a detection delay is shown in FIG. 18.

FIG. 18 illustrates a generation detecting circuit 102E, and the peripheral circuits located near the generation detecting circuit 102E, that is, a generator portion 101 for generating AC power, a rectifier circuit 103 for rectifying the alternating current output from the generator portion 101 and for converting it into a direct current, and a storage device 104 for storing the direct current output from the rectifier circuit 103.

The generation detecting circuit 102E is formed of a NAND circuit 201 for outputting the NAND of outputs of a first comparator COMP1 and a second comparator COMP2, which will be discussed below, and a smoothing circuit 202 for smoothing the output of the NAND circuit 201 by using an R-C integrating circuit and for outputting the smoothed output as the generation-detecting result signal SA.

The rectifier circuit 103 is formed of: a first comparator COMP1 for performing on/off control of a first transistor Q1 by comparing the voltage of one output terminal AG1 of the generator portion 101 with the reference voltage VDD so as to allow the first transistor Q1 to perform active rectification; a second comparator COMP2 for turning on/off a second transistor Q2 alternately with the transistor Q1 by comparing the voltage of the other output terminal AG2 of the generator portion 101 with the reference voltage VDD so as to allow the second transistor Q2 to perform active rectification; a third transistor Q3 which is turned on when the terminal voltage V2 of the terminal AG2 of the generator portion 101 exceeds a predetermined threshold voltage; and a fourth transistor Q4 which is turned on when the terminal voltage V1 of the terminal AG1 of the generator portion 101 exceeds a predetermined threshold voltage.

First, the charging operation is described below.

When the generator portion 101 starts generating power, the generation voltage is supplied to both the output terminals AG1 and AG2. In this case, the phase of the terminal voltage V1 of the output terminal AG1 and the phase of the terminal voltage V2 of the output terminal AG2 are inverted with respect to each other.

When the terminal voltage V1 of the output terminal AG1 exceeds the threshold voltage, the fourth transistor Q4 is turned on. Thereafter, when the terminal voltage V1 increases and exceeds the voltage of the power supply VDD, the output of the first comparator COMPI becomes an "L" level so as to turn on the first transistor Q1.

On the other hand, since the terminal voltage V2 of the output terminal AG2 is below the threshold voltage, the third transistor Q3 is in the off state, and the terminal voltage V2 is lower than the voltage of the power supply VDD. Thus, the output of the second comparator COMP2 is at an "H" level, and the second transistor Q2 is in the off state.

Accordingly, while the first transistor Q1 is in the on state, the generation current flows in a path "terminal AG1→first transistor→power supply VDD→storage device 104→power supply VTKN→fourth transistor Q4", and the storage device 104 is charged.

Then, when the terminal voltage V1 of the output terminal AG1 drops and becomes lower than the voltage of the power supply VDD, the output of the first comparator COMP1 becomes an "H" level, thereby turning off the first transistor Q1. Accordingly, the terminal voltage V1 of the output terminal AG1 becomes less than the threshold voltage of the fourth transistor Q4, thereby turning off the fourth transistor Q4.

In contrast, when the terminal voltage V2 of the output terminal AG2 exceeds the threshold voltage, the third transistor Q3 is turned on. Then, when the terminal voltage V2 increases and exceeds the voltage of the power supply VDD, the output of the second comparator COMP2 becomes an "L" level, and the second transistor Q2 is turned on.

Accordingly, while the second transistor Q2 is in the on state, the generation current flows in a path "terminal AG2→second transistor Q2→power supply VDD→storage device 104→power supply VTKN→third transistor Q3", and the storage device 104 is charged.

As stated above, when the generation current flows, the output of the first comparator COMP1 or the second comparator COMP2 is at an "L" level.

Thus, the NAND circuit 201 of the generation detecting circuit 102E computes a logical NAND of the outputs of the first comparator COMPI and the second comparator COMP2, thereby outputting an "H"-level signal to the smoothing circuit 202 while the generation current is flowing.

In this case, the output of the NAND circuit 201 contains switching noise, and thus, the smoothing circuit 202 smoothes the output of the NAND circuit 201 by using the R-C integrating circuit and outputs it as the generation-detecting result signal SA.

The detection signal output from such a generation detecting circuit 102E contains a detection delay because of its configuration. Accordingly, without considering this detection delay, the motor is not rotated correctly due to a detection leakage.

Thus, in the fifth embodiment, the motor is correctly rotated by taking this detection delay into consideration.

[5.2] Advantages of Fifth Embodiment

As discussed above, according to the fifth embodiment, even with the occurrence of a detection delay in the generation detecting circuit 102E, when conditions for reliably outputting the correcting driving pulses are met, that is, when power generation for charging the storage device 104 is detected by the generation detecting circuit 102E while the high-frequency magnetic-field detection pulses SP0, the AC magnetic-field detection pulses SP11 and SP12, the normal driving pulses K11, or the rotation detection pulses SP2 are being output, the output of the pulses is discontinued, and the output of the subsequent pulses is also inhibited. Thus, the rotation of the motor coil is reliably ensured by the correcting driving pulses. Accordingly, the need for outputting the various pulses SP0, SP11, SP12, K11, and SP2 is eliminated since the reliable rotation of the motor is ensured by the correcting driving pulses, and power required for outputting these pulses can thus be reduced.

Additionally, the generation detecting circuit 102E detects the presence or the absence of power generation for charging the storage device 104 via a path different from the charging path to the secondary cell. It is thus possible to simultaneously perform power generation detection and actual charging processing, and the charging efficiency is not lowered, which may otherwise be incurred upon detecting power generation.

[6.1] First Example of Modifications

In the foregoing description, when charging is detected in the charging detecting operation, the voltage level of the induction voltage or the rotation reference voltage used for detecting the rotation is shifted so that the erroneous detection of the rotation of the no-rotation motor can be prevented. Instead of performing the charging detection or in addition to the charging detection, control similar to the above-described control may be performed in detecting a power-generation magnetic field.

[6.2] Second Example of Modifications

In the foregoing embodiments, a single motor is controlled. If, however, a plurality of motors may be disposed in one environment, for example, if a plurality of motors are built in a wristwatch, they may be simultaneously controlled by a single generation detecting circuit (generator AC magnetic-field detection circuit).

[6.3] Third Example of Modifications

In the above-described embodiments, when a power-generation magnetic field is detected, the correcting driving pulses are output rather than the normal driving pulses. Alternatively, the output of the normal driving pulses may not be prohibited, and the normal driving pulses may be output prior to the output of the correcting driving pulses.

In this case, it is necessary to consider the polarity of both the driving pulses so that the motor is driven to a correct position by the correcting driving pulses and the normal driving pulses rather than being excessively driven. More specifically, the polarity of the correcting driving pulses is set to be the same as the normal driving pulses. Accordingly, since the direction of the current flowing in the motor coil is the same, the polarity of the correcting driving pulses is opposite to the current direction corresponding to the direction in which the motor is subsequently rotated. Thus, even if the correcting driving pulses are output by detecting power generation after the motor is rotated by the normal driving pulses, it is possible to prevent the rotation of the motor caused by the correcting driving pulses after the rotation of the motor by the normal driving pulses.

[6.4] Fourth Example of Modifications

As the generator portion of the present invention, any type of device may be applied, except when a power-generation magnetic-field is detected instead of charging.

For example, electromagnetic generators in which a generation rotor is rotated by a crown or dynamic energy stored in a spring may be applied to the generator portion of the present invention.

Alternatively, a system in which charging is performed by converting an external alternating magnetic field or an electromagnetic wave into electric energy by an induction coil may also be applied to the generator portion of the present invention.

[6.5] Fifth Example of Modifications

Although in the foregoing embodiments a wristwatch-type timepiece apparatus has been described by way of example, the present invention may be applied to any type of timepiece apparatus provided with a motor in which a magnetic field is generated during power generation, such as a pocket-type timepiece, a card-type portable timepiece, etc.

[6.6] Sixth Example of Modifications

Although in the above-described embodiments a wristwatch-type timepiece apparatus has been described by way of example, the present invention may be applied to any type of electronic apparatus provided with a motor in which a magnetic field is generated during power generation.

For example, the present invention may be applied to electronic apparatuses, such as music players, music recorders, image players and image recorders (for CD, MD, DVD, magnetic tape), portable devices thereof, computer peripheral devices (floppy disk drives, hard disk drives, MO drives, DVD drives, printers, etc.) and portable devices thereof.

[7] Advantages of Embodiments

According to the embodiments of the present invention, the voltage level of the rotation detecting voltage is relatively shifted by a predetermined amount to a no-rotation side based on the generation state of the generator portion and the charging state of the storage portion. The erroneous detection of the rotation of the no-rotation motor can be prevented, thereby making it possible to ensure the reliable rotation of the motor. Particularly in a timepiece apparatus, the time can be accurately indicated.

What is claimed is:

1. An electronic apparatus comprising:

a power generator portion for performing power generation;

a storage portion for storing electric energy obtained by said power generation;

at least one motor driven by the electric energy stored in said storage portion;

a pulse driving controller for controlling the driving of said motor by outputting a driving pulse signal;

a rotation detecting portion for detecting whether said motor has rotated by comparing a rotation detecting voltage corresponding to an induction voltage generated in said motor caused by the rotation of said motor with a rotation reference voltage;

a state detecting portion for detecting a generation state of said power generator portion or a charging state of said storage portion caused by said power generation; and a voltage setting portion for setting said rotation detecting voltage or said rotation reference voltage based on the generation state of said power generator portion or said charging state of said storage portion detected by said state detecting portion so that a difference between said rotation detecting voltage when said motor has not rotated and said rotation reference voltage is increased.

2. An electronic apparatus according to claim 1, wherein said voltage setting portion comprises a voltage shifting portion for relatively shifting the voltage level of said rotation detecting voltage to a no-rotation side by a predetermined amount.

3. An electronic apparatus according to claim 1, wherein said state detecting portion comprises a charging detecting portion for detecting whether said charging is being performed in said storage portion.

4. An electronic apparatus according to claim 1, wherein said state detecting portion comprises a power-generation magnetic-field detecting portion for detecting whether a magnetic field has been generated by the power generation of said power generator portion.

5. An electronic apparatus according to claim 2, wherein said rotation detecting portion comprises a rotation-detecting impedance device, and said voltage shifting portion comprises an impedance reducing portion for effectively reducing the impedance of said rotation-detecting impedance device.

6. An electronic apparatus according to claim 5, wherein said rotation-detecting impedance device comprises a plurality of auxiliary rotation-detecting impedance devices, and said impedance-reducing portion effectively reduces the impedance of said rotation-detecting impedance device by short-circuiting at least one of said plurality of auxiliary rotation-detecting impedance devices.

7. An electronic apparatus according to claim 5, wherein said rotation-detecting impedance device comprises a plurality of auxiliary rotation-detecting impedance devices, and said impedance-reducing portion effectively reduces the impedance of said rotation-detecting impedance device by switching said plurality of auxiliary rotation-detecting impedance devices.

8. An electronic apparatus according to claim 5, wherein said rotation-detecting impedance device comprises a resistor device.

9. An electronic apparatus according to claim 1, further comprising a chopper amplifier portion for performing chopper amplification on said induction voltage and for outputting the amplified induction voltage as said rotation detecting voltage, wherein said voltage setting portion comprises an amplification-factor reducing portion for reducing an amplification factor of said chopper amplifier portion based on the generation state of said power generator portion or said charging state of said storage portion detected by said state detecting portion.

10. An electronic apparatus according to claim 9, wherein said amplification-factor reducing portion comprises a voltage-drop-device inserting portion for inserting a voltage drop device in a path of a chopper current generated by said chopper amplification.

11. An electronic apparatus according to claim 9, wherein said chopper amplifier portion performs the chopper amplification at a frequency corresponding to a chopper-amplification control signal, and said amplification-factor reducing portion sets the frequency of said chopper-amplification control signal in a detection period of a predetermined generation state or a predetermined charging state caused by said power generation to be higher by a predetermined amount than said chopper-amplification control signal in a no-detection period of said predetermined generation state or said predetermined charging state.

12. An electronic apparatus according to claim 9, wherein said chopper amplifier portion sets a chopper duty in a detection period of said charging to be greater or smaller than said chopper duty in a no-detection period of said charging, which is a reference chopper duty.

13. An electronic apparatus according to claim 1, wherein said voltage setting portion comprises a voltage shifting portion for shifting the voltage level of said rotation reference voltage to a rotation side by a predetermined amount relative to said rotation detecting voltage based on the generation state of said power generator portion or said charging state of said storage portion detected by said state detecting portion.

14. An electronic apparatus according to claim 13, wherein said pulse driving controller outputs a rotation-detecting pulse signal used for detecting the rotation by said rotation detecting portion after the lapse of a predetermined period from an output of said driving pulse signal, and said voltage shifting portion sets terminals of a coil forming said motor in a closed loop during said predetermined period based on the generation state of said power generator portion or the charging state of said storage portion detected by said state detecting portion.

15. An electronic apparatus according to claim 13, wherein said driving pulse signal comprises a plurality of auxiliary driving pulse signals, and said voltage shifting portion sets an effective power of the last auxiliary driving pulse signal in an output period of said driving pulse signal to be greater than an effective power of the other auxiliary driving pulse signal in the output period of said driving pulse signal.

16. An electronic apparatus according to claim 13, wherein said voltage shifting portion comprises a reference-voltage selecting portion for selecting one of a plurality of basic rotation reference voltages as said rotation reference voltage based on the generation state of said power generator portion or the charging state of said storage portion detected by said state detecting portion.

17. An electronic apparatus according to claim 16, wherein said state detecting portion detects said charging state based on a charging current flowing in said storage portion.

18. An electronic apparatus according to claim 16, wherein said state detecting portion detects said charging state based on a charging voltage of said storage portion.

19. An electronic apparatus according to claim 2, wherein said pulse driving controller outputs a rotation-detecting pulse signal used for detecting the rotation by said rotation detecting portion after the lapse of a predetermined period from an output of said driving pulse signal, and said voltage shifting portion sets terminals of a coil forming said motor in a closed loop during said predetermined period based on the generation state of said power generator portion or the charging state of said storage portion detected by said state detecting portion.

20. An electronic apparatus according to claim 19, wherein said voltage shifting portion sets a frequency of said driving pulse signal in a detection period of a predetermined generation state or a predetermined charging state to be lower than a frequency in a no-detection period of said predetermined generation state or said predetermined charging state based on the generation state of said power generator portion or the charging state of said storage portion detected by said state detecting portion.

21. An electronic apparatus according to claim 2, wherein said driving pulse signal comprises a plurality of auxiliary driving pulse signals, and said voltage shifting portion sets an effective power of the last auxiliary driving pulse signal in an output period of said driving pulse signal to be greater than an effective power of the other auxiliary driving pulse signal in the output period of said driving pulse signal.

22. An electronic apparatus according to claim 1, wherein said electronic apparatus is portable.

23. An electronic apparatus according to claim 1, wherein said electronic apparatus comprises a timepiece portion for performing a timing operation.

24. A control method for an electronic apparatus which comprises a power generator portion for performing power generation, a storage portion for storing electric energy obtained by said power generation, at least one motor driven by the electric energy stored in said storage portion, and a pulse driving controller for controlling the driving of said motor by outputting a driving pulse signal, said control method comprising:

a rotation detecting step of detecting whether said motor has rotated by comparing a rotation detecting voltage corresponding to an induction voltage generated in said motor caused by the rotation of said motor with a rotation reference voltage;

a state detecting step of detecting a generation state of said power generator portion or a charging state of said storage portion caused by said power generation; and a voltage shifting step of shifting the voltage level of said rotation detecting voltage to a no-rotation side by a predetermined amount relative to said rotation reference voltage based on the generation state of said power generator portion or the charging state of said storage portion detected in said state detecting step.

25. A control method for an electronic apparatus which comprises a power generator portion for performing power generation, a storage portion for storing electric energy obtained by said power generation, at least one motor driven by the electric energy stored in said storage portion, and a pulse driving controller for controlling the driving of said motor by outputting a driving pulse signal, said control method comprising:

a rotation detecting step of detecting whether said motor has rotated by comparing a rotation detecting voltage corresponding to an induction voltage generated in said motor caused by the rotation of said motor with a rotation reference voltage;

a state detecting step of detecting a generation state of said power generator portion or a charging state of said storage portion caused by said power generation; and a voltage shifting step of shifting the voltage level of said rotation reference voltage to a rotation side by a predetermined amount relative to said rotation detecting voltage based on the generation state of said power generator portion or the charging state of said storage portion detected in said state detecting step.

26. An electronic apparatus comprising:

a generator for generating power;

a storage element for storing power generated by the generator;

a motor driven by the electric energy stored in the storage element;

a pulse driving controller for controlling the driving of the motor by outputting a driving pulse signal; and a rotation detector for detecting whether the motor has rotated by comparing a rotation detection voltage corresponding to an induction voltage generated in the motor caused by its rotation with a rotation reference voltage;

a state detecting unit for detecting a generation state of the generator or a charging state of the storage element; and a voltage setter for setting the rotation detecting voltage or the rotation reference voltage based on the generation state of the generator or the charging state of the storage element;

wherein, a case in which rotation of the motor is detected by the rotation detector, either (i) the level of the induction voltage generated on inputting rotation detecting pulses is shifted to a no-rotation detecting side, or (ii) the level of the rotation reference voltage is shifted to a rotation detecting side.

27. An electronic apparatus according to claim 26, wherein the level of the induction voltage generated on inputting rotation detecting pulses is shifted to the no-rotation detecting side by reducing impedance of a portion of the rotation detector.

28. An electronic apparatus according to claim 26, wherein the level of the induction voltage generated on inputting rotation detecting pulses is shifted to the no-rotation detecting side by controlling the duty ratio of the rotation detecting pulses.

29. An electronic apparatus comprising:

a generator for generating power;

a storage element for storing power generated by the generator;

a motor having a rotor driven by the electric energy stored in the storage element;

a pulse driving controller for controlling the driving of the motor by outputting a driving pulse signal; and a rotation detector for detecting whether the motor has rotated by comparing a rotation detection voltage corresponding to an induction voltage generated in the motor caused by its rotation with a rotation reference voltage; and a state detecting unit for detecting a generation state of the generator or a charging state of the storage element;

wherein, free vibrations of the rotor are inhibited so as to suppress the induction voltage level, when generation of the generator or a charging of the storage element is detected by the state detecting unit.

* * * * *